US00RE48223E

(19) United States
(12) Reissued Patent
Kang et al.

(10) Patent Number: US RE48,223 E
(45) Date of Reissued Patent: Sep. 22, 2020

(54) METHOD FOR TRANSMITTING ACK/NACK SIGNALS, AND BASE STATION AND USER EQUIPMENT FOR THE METHOD

(71) Applicant: LG ELECTRONICS INC., Seoul (KR)

(72) Inventors: Ji Won Kang, Anyang-si (KR); Jin Young Chun, Anyang-si (KR); Su Nam Kim, Anyang-si (KR); Bin Chul Ihm, Anyang-si (KR); Sung Ho Park, Anyang-si (KR)

(73) Assignee: LG ELECTRONICS INC., Seoul (KR)

(21) Appl. No.: 15/453,863

(22) Filed: Mar. 8, 2017

Related U.S. Patent Documents

Reissue of:
(64) Patent No.: 8,976,660
Issued: Mar. 10, 2015
Appl. No.: 13/695,274
PCT Filed: Apr. 28, 2011
PCT No.: PCT/KR2011/003153
§ 371 (c)(1),
(2) Date: Oct. 29, 2012
PCT Pub. No.: WO2011/136584
PCT Pub. Date: Nov. 3, 2011

U.S. Applications:
(60) Provisional application No. 61/329,103, filed on Apr. 29, 2010, provisional application No. 61/332,798,
(Continued)

(30) Foreign Application Priority Data

Sep. 10, 2010 (KR) ..... 10-2010-0088840

(51) Int. Cl.
*H04J 1/16* (2006.01)
*H04W 4/00* (2018.01)
(Continued)

(52) U.S. Cl.
CPC ..... *H04L 5/0053* (2013.01); *H04L 1/1671* (2013.01); *H04L 1/1854* (2013.01);
(Continued)

(58) Field of Classification Search
CPC ..... H04W 72/0413; H04W 72/0446; H04W 48/16; H04W 72/00; H04B 1/7097;
(Continued)

(56) References Cited

U.S. PATENT DOCUMENTS 7,292,854 B2 * 11/2007 Das ..... H04L 1/0072 370/320
8,031,688 B2 * 10/2011 Papasakellariou .... H04L 5/0007 370/344
(Continued)

FOREIGN PATENT DOCUMENTS

| | | |
|---|---|---|
| EP | 2015498 | 1/2009 |
| EP | 2139289 | 12/2009 |
| WO | 2009098224 | 8/2009 |

OTHER PUBLICATIONS

3rd Generation Partnership Project (3GPP), "Technical Specification Group Radio Access Network; Evolved Universal Terrestrial Radio Access (E-UTRA); Physical layer procedures (Release 9)," 3GPP TS 36.213 V9.1.0, Mar. 2010, 79 pages.
(Continued)

*Primary Examiner* — David E England
(74) *Attorney, Agent, or Firm* — Lee Hong Degerman Kang & Waimey

(57) ABSTRACT

According to one aspect of the present invention, values which are specifically defined for each user equipment are reflected when resource allocation/mapping of downlink/uplink ACK/NACK channels is performed, so as to vary uplink/downlink ACK/NACK information transmitting resources for each user equipment allocated to the same downlink/uplink resource. According to another aspect of
(Continued)

the present invention, nodes for transmitting uplink/downlink ACK/NACK information vary for each user equipment allocated to the same downlink/uplink resource. According to the present invention, even when downlink/uplink signals for a plurality of user equipment are transmitted from the same resource, uplink/downlink ACK/NACK signals of the plurality of user equipment are transmitted from different resources, thereby reducing interferences among ACK/NACK signals of the plurality of user equipment.

26 Claims, 21 Drawing Sheets

Related U.S. Application Data filed on May 9, 2010, provisional application No. 61/334,160, filed on May 12, 2010, provisional application No. 61/351,299, filed on Jun. 4, 2010.

(51) Int. Cl.

| | |
|---|---|
| ***H04L 5/00*** | (2006.01) |
| ***H04L 1/16*** | (2006.01) |
| ***H04L 1/18*** | (2006.01) |
| *H04B 7/024* | (2017.01) |
| *H04L 1/00* | (2006.01) |
| *H04L 25/03* | (2006.01) |
| *H04W 72/04* | (2009.01) |

(52) U.S. Cl.
CPC ..... *H04L 1/1861* (2013.01); *H04L 5/0035* (2013.01); *H04L 5/0055* (2013.01); *H04B 7/024* (2013.01); *H04L 1/0026* (2013.01); *H04L 1/1812* (2013.01); *H04L 5/0023* (2013.01); *H04L 25/03891* (2013.01); *H04W 72/0406* (2013.01)

(58) Field of Classification Search
CPC ..... H04B 2201/698; H04B 2201/7097; H04L 1/001; H04L 1/0057; H04L 5/0016; H04L 1/1822; H04L 5/0055; H04L 1/007; H04L 1/0073; H04L 5/0048; H04L 5/0053; H04L 1/1671; H04L 2001/125
USPC ..... 370/235, 329, 252
See application file for complete search history.

(56) References Cited

U.S. PATENT DOCUMENTS

| | | | | |
|---|---|---|---|---|
| 8,068,457 | B2 * | 11/2011 | Pi | H04B 7/0417 370/235 |
| 8,249,022 | B2 * | 8/2012 | Dalsgaard | H04L 1/0025 370/329 |
| 8,289,935 | B2 * | 10/2012 | Frederiksen | H04L 1/1607 370/337 |
| 8,531,962 | B2 * | 9/2013 | Chen | H04L 1/1854 370/236 |
| 8,543,124 | B2 * | 9/2013 | Papasakellariou | H04L 1/1692 455/450 |
| 8,555,126 | B2 * | 10/2013 | Lohr | H04W 72/042 714/748 |
| 8,559,381 | B2 * | 10/2013 | Ojala | H04L 1/1854 370/329 |
| 8,611,261 | B2 * | 12/2013 | Che | H04L 1/1692 370/278 |
| 8,730,922 | B2 * | 5/2014 | Hultell | H04B 7/0404 370/329 |
| 8,824,347 | B2 * | 9/2014 | Pelletier | H04L 1/1883 370/311 |
| 8,873,493 | B2 * | 10/2014 | Seo | H04L 1/0026 370/329 |
| 8,923,232 | B2 * | 12/2014 | Baldemair | H04L 5/001 370/329 |
| 8,976,660 | B2 * | 3/2015 | Kang | H04L 1/1861 370/235 |
| 9,036,564 | B2 * | 5/2015 | Damnjanovic | H04L 1/1607 370/329 |
| 9,084,277 | B2 * | 7/2015 | Montojo | H04L 1/1607 |
| 9,485,060 | B2 * | 11/2016 | Nayeb Nazar | H04L 1/007 |
| 9,622,244 | B2 * | 4/2017 | Papasakellariou | H04L 5/0007 |
| 10,045,348 | B2 * | 8/2018 | Papasakellariou | H04L 5/0007 |
| 10,412,737 | B2 * | 9/2019 | Papasakellariou | H04L 5/0007 |
| 2008/0075184 | A1 | 3/2008 | Muharemovic et al. | |
| 2008/0102879 | A1 * | 5/2008 | Heo et al. | 455/522 |
| 2009/0055703 | A1 | 2/2009 | Kim et al. | |
| 2009/0103558 | A1 * | 4/2009 | Zangi et al. | 370/447 |
| 2009/0196240 | A1 * | 8/2009 | Frederiksen | H04L 1/1607 370/329 |
| 2009/0199063 | A1 | 8/2009 | Chun et al. | |
| 2010/0172308 | A1 * | 7/2010 | Nam | H04L 1/1829 370/329 |
| 2010/0202373 | A1 * | 8/2010 | Chun | H04L 1/0027 370/329 |
| 2011/0064019 | A1 * | 3/2011 | Chun | H04L 5/0053 370/315 |
| 2011/0076987 | A1 * | 3/2011 | Lee et al. | 455/411 |
| 2011/0107169 | A1 * | 5/2011 | Lohr | H04W 72/042 714/748 |
| 2011/0176593 | A1 * | 7/2011 | Hultell et al. | 375/224 |
| 2011/0243066 | A1 * | 10/2011 | Nayeb Nazar | H04L 1/007 370/328 |
| 2011/0268054 | A1 * | 11/2011 | Abraham et al. | 370/329 |
| 2012/0093096 | A1 * | 4/2012 | Barbieri | H04J 3/1694 370/329 |
| 2012/0113831 | A1 * | 5/2012 | Pelletier | H04L 5/0053 370/252 |
| 2012/0307775 | A1 * | 12/2012 | Chung et al. | H04L 1/1671 370/329 |
| 2012/0320852 | A1 * | 12/2012 | Seo et al. | H04L 5/005 370/329 |
| 2013/0121271 | A1 * | 5/2013 | Chen et al. | 370/329 |
| 2013/0258970 | A1 * | 10/2013 | Kim et al. | 370/329 |

OTHER PUBLICATIONS

3rd Generation Partnership Project (3GPP), "Technical Specification Group Radio Access Network; Evolved Universal Terrestrial Radio Access (E-UTRA); Radio Resource Control (RRC); Protocol specification (Release 9)," 3GPP TS 36.331 V9.2.0, Mar. 2010, 248 pages.

Nokia, "PHICH and mapping to PHICH groups", R1-080301, 3GPP TSG RAN WG1 Meeting #51bis, Jan. 2008, 5 pages.

Zang et al., "Comments on AWD 15.3.6 DL-CTRL," Intel Corporation, IEEE C802.16m-09/0947, Apr. 2009, 21 pages.

European Patent Office Application Serial No. 11775289.9, Search Report dated Jun. 6, 2017, 11 pages.

LG Electronics, "ACK/NACK transmission approach in LTE-A", 3GPP TSG RAN WG1 Meeting #60bis, R1-102412, Apr. 2010, 6 pages.

NTT Docomo et al., "Implicit Resource Allocation of ACK/NACK Signal in E-UTRA Uplink", 3GPP TSG RAN WG1 Meeting #49, R1-072439, May 2007, 4 pages.

3rd Generation Partnership Project (3GPP), "Technical Specification Group Radio Access Network; Evolved Universal Terrestrial Radio Access (E-UTRA); Physical layer procedures (Release 9)," 3GPP TS 36.213 V9.1.0, Mar. 2010, XP050401971, 81 pages.

PCT International Application No. PCT/KR2011/003153, Written Opinion of the International Searching Authority, dated Jan. 19, 2012, 18 pages.

* cited by examiner

METHOD FOR TRANSMITTING ACK/NACK SIGNALS, AND BASE STATION AND USER EQUIPMENT FOR THE METHOD

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application *is a reissue of U.S. Pat. No. 8,976,660 B2, which issued on Mar. 10, 2015, from U.S. patent application Ser. No. 13/695,374, filed on Oct. 29, 2012, which* is the National Stage filing under 35 U.S.C. 371 of International Application No. PCT/KR2011/003153, filed on Apr. 28, 2011, which claims the benefit of earlier filing date and right of priority to Korean Patent Application No. 10-2010-0088840, filed on Sep. 10, 2010, and also claims the benefit of U.S. Provisional Application [Ser.] No. 61/329,103, filed on Apr. 29, 2010, U.S. Provisional Application [Ser.] No. 61/332,798, filed on May 9, 2010, U.S. Provisional Application [Ser.] No. 61/334,160, filed on May 12, 2010, and U.S. Provisional Application [Ser.] No. 61/351,299, filed on Jun. 4, 2010, the contents of which are all hereby incorporated by reference herein in their entirety.

TECHNICAL FIELD

The present invention relates to a wireless communication system. More specifically, the present invention relates to a method of transmitting an ACKnowledgement/Negative-AC-Knowledgement (ACK/NACK) signal in a multi-node system supporting multi-node coordinated transmission and a base station and a user equipment for the same.

BACKGROUND ART

With development of the information industry, a technology that is capable of transmitting various large amounts of data at high speed has been required. To this end, research has been conducted into a multi-node or multi-cell coordinated transmission method that simultaneously performs communication at multiple nodes using the same resource. In the multi-node or multi-cell coordinated transmission method, the respective nodes perform coordinated transmission, thereby providing higher performance than when signals are transmitted without coordination.

A multi-node system supporting multi-node coordinated communication uses a plurality of nodes, each of which operates as a base station, an access point, an antenna, an antenna group, or a radio remote header (RRH). The nodes may be managed by a base station or a base station controller which controls operations of the nodes or performs scheduling. In the multi-node system, distributed nodes are connected to a base station or a base station controller, which manages a plurality of nodes spaced apart from each other by a predetermined distance or more in a cell, through a cable or a dedicated line. The multi-node system may be considered as a kind of Multiple Input Multiple Output (MIMO) system in that distributed nodes can support a single user equipment or multiple user equipments by simultaneously transmitting and receiving different data streams.

In terms of the MIMO system, the multi-node system transmits signals using nodes distributed at various positions. Consequently, a transmission area covered by each antenna is reduced as compared with a centralized antenna system (CAS), and therefore, transmit power can be reduced. In addition, the transmission distance between an antenna and a user equipment is reduced, resulting in a decrease in path loss and enabling data transmission at high speed. This can improve transmission capacity and power efficiency of a cellular system and satisfy communication performance of relatively uniform quality regardless of user locations in a cell. Furthermore, a base station(s) or a base station controller(s) connected to a plurality of distributed nodes cooperate with each other in the multi-node system, and therefore, signal loss is reduced, and correlation and interference between antennas and reduced. According to the multi-node coordinated transmission method, therefore, it is possible to obtain a high signal to interference-plus-noise ratio (SINR).

Consequently, the multi-node coordinated transmission method may be used with or replace the conventional centralized antenna system (CAS) to become a new foundation of cellular communications in order to reduce base station installation cost and backhaul network maintenance cost and, at the same time, to extend service coverage and to improve channel capacity and SINR in a next-generation mobile communication system.

DISCLOSURE

Technical Problem

The present invention proposes a method of reducing signal interference between a plurality of user equipments generated during uplink transmission and/or downlink transmission as control information or data for the plurality of user equipments are multiplexed to the same resource in multi-node or multi-cell coordinated communication or multi-user MIMO transmission.

It is to be understood that objects to be achieved by the present invention are not limited to the aforementioned objects and other objects which are not mentioned will be apparent to those of ordinary skill in the art to which the present invention pertains from the following description.

Technical Solution

The present invention relates to a wireless communication system. Particularly in a multi-node coordinated transmission system configured such that a plurality of nodes spaced apart from each other by a predetermined distance or more performs coordinated transmission, resources allocated to ACK/NACK channels of different user equipments may collide with each other. In order to solve this problem, the present invention proposes a method of allocating ACK/NACK channels of different user equipments to different resources in the multi-node coordinated transmission system.

In accordance with one aspect of the present invention, there is provided a method of transmitting, by a base station controlling at least one of a plurality of nodes spaced apart from each other by a predetermined distance or more, a downlink ACKnowledgement/Negative-ACKnowledgement (ACK/NACK) signal to a user equipment simultaneously receiving signals from the plurality of nodes. The method comprises: allocating a resource to an ACK/NACK channel carrying the ACK/NACK signal using an offset $n^{DL}_{offset}$ specific to the user equipment and transmitting the ACK/NACK channel on the resource, wherein the offset $n^{DL}_{offset}$ is a value decided based on at least one from among a value defined by an upper layer with respect to the user equipment, an identifier of a node used in uplink transmission, which is a subject of the ACK/NACK signal, a kind of the node used in the uplink transmission, an identifier of a node to be used in transmission of the ACK/NACK signal, a kind of the node to be used in transmission of the ACK/NACK signal, a pattern index of a reference signal allocated to the user equipment, and a multiplexing sequence of a resource used in the uplink transmission.

In accordance with another aspect of the present invention, there is provided a base station for transmitting an Acknowledgement/Negative-ACKnowledgement (ACK/NACK) signal to a user equipment simultaneously receiving signals from a plurality of nodes spaced apart from each other by a predetermined distance or more, wherein the base station controls at least one of the plurality of nodes. The base station comprises: a processor configured to allocate a resource to an ACK/NACK channel carrying the ACK/NACK signal using an offset $n^{DL}_{offset}$ specific to the user equipment and a transmitter configured to transmit the ACK/NACK channel on the resource under control of the processor, wherein the offset $n^{DL}_{offset}$ is a value decided based on at least one from among a value defined by an upper layer with respect to the user equipment, an identifier of a node used in uplink transmission, which is a subject of the ACK/NACK signal, a kind of the node used in the uplink transmission, an identifier of a node to be used in transmission of the ACK/NACK signal, a kind of the node to be used in transmission of the ACK/NACK signal, a pattern index of a reference signal allocated to the user equipment, and a multiplexing sequence of a resource used in the uplink transmission.

In accordance with another aspect of the present invention, there is provided a method of transmitting, by a user equipment simultaneously receiving signals from a plurality of nodes spaced apart from each other by a predetermined distance or more, a uplink ACKnowledgement/Negative-AC-Knowledgement (ACK/NACK) signal to a base station controlling at least one of the plurality of nodes. The method comprises: allocating a resource to an ACK/NACK channel carrying the ACK/NACK signal using an offset $n^{DL}_{offset}$ specific to the user equipment and transmitting the ACK/NACK channel on the resource, wherein the offset $n^{DL}_{offset}$ is a value decided based on at least one from among a value defined by an upper layer with respect to the user equipment, an identifier of a node used in downlink transmission, which is a subject of the ACK/NACK signal, a kind of the node used in the downlink transmission, an identifier of a node to be used in transmission of the ACK/NACK signal, a kind of the node to be used in transmission of the ACK/NACK signal, a pattern index of a reference signal allocated to the user equipment, and a multiplexing sequence of a resource used in the downlink transmission.

In accordance with another aspect of the present invention, there is provided a user equipment for transmitting an ACKnowledgement/Negative-ACKnowledgement (ACK/NACK) signal to a base station controlling at least one of a plurality of nodes spaced apart from each other by a predetermined distance or more, wherein the user equipment simultaneously receives signals from the plurality of nodes, the user equipment. The user equipment comprises: a processor configured to allocate a resource to an ACK/NACK channel carrying the ACK/NACK signal using an offset $n^{DL}_{offset}$ specific to the user equipment and a transmitter configured to transmit the ACK/NACK channel on the resource under control of the processor, wherein the offset $n^{DL}_{offset}$ is a value decided based on at least one from among a value defined by an upper layer with respect to the user equipment, an identifier of a node used in downlink transmission, which is a subject of the ACK/NACK signal, a kind of the node used in the downlink transmission, an identifier of a node to be used in transmission of the ACK/NACK signal, a kind of the node to be used in transmission of the ACK/NACK signal, a pattern index of a reference signal allocated to the user equipment, and a multiplexing sequence of a resource used in the downlink transmission.

In accordance with another aspect of the present invention, there is provided a method of transmitting, by a base station controlling at least one of a plurality of nodes spaced apart from each other by a predetermined distance or more, a downlink ACKnowledgement/Negative-ACKnowledgement (ACK/NACK) signal transmission method including, in a base station, which controls at least one of a plurality of nodes to a user equipment simultaneously receiving signals from the plurality of nodes. The method comprises: spreading the ACK/NACK signal using a spreading sequence of a predetermined spreading rate, multiplexing the ACK/NACK signal to an ACK/NACK channel group, allocating the ACK/NACK signal to at least one of the nodes, and transmitting the ACK/NACK signal on a resource region corresponding to the ACK/NACK channel group through the at least one node.

In accordance with another aspect of the present invention, there is provided a base station for transmitting an ACKnowledgement/Negative-ACKnowledgement (ACK/NACK) signal to a user equipment simultaneously receiving signals from a plurality of nodes spaced apart from each other by a predetermined distance or more, wherein the base station controls at least one of the plurality of nodes. The base station comprises: a processor configured to spread the ACK/NACK signal using a spreading sequence of a predetermined spreading rate, to multiplex the ACK/NACK signal to an ACK/NACK channel group, and to allocate the ACK/NACK signal to at least one of the nodes, and a transmitter configured to transmit the ACK/NACK signal on a resource region corresponding to the ACK/NACK channel group through the at least one node under control of the processor.

In accordance with another aspect of the present invention, there is provided a method of receiving, by a user equipment simultaneously receiving signals from a plurality of nodes controlled by one or more base stations and spaced apart from each other by a predetermined distance or more, a downlink ACKnowledgement/Negative-ACKnowledgement (ACK/NACK) signal. The method comprises: receiving an ACK/NACK channel group, with which the ACK/NACK signal of the user equipment is multiplexed, on a resource region corresponding to the ACK/NACK channel group, from at least one of the plurality of nodes, and acquiring the ACK/NACK signal of the user equipment using a spreading sequence applied to the ACK/NACK signal of the user equipment.

In accordance with yet another aspect of the present invention, there is provided a user equipment for receiving ACKnowledgement/Negative-ACKnowledgement (ACK/NACK) signal, wherein the user equipment simultaneously receives signals from a plurality of nodes controlled by one or more base stations and spaced apart from each other by a predetermined distance or more. The user equipment comprises: a receiver configured to receive an ACK/NACK channel group, with which the ACK/NACK signal of the user equipment is multiplexed, on a resource region corresponding to the ACK/NACK channel group, from at least one of the plurality of nodes, and a processor configured to acquire the ACK/NACK signal of the user equipment using a spreading sequence applied to the ACK/NACK signal of the user equipment.

In the respective aspects of the present invention, the ACK/NACK channel may be a Physical Hybrid automatic retransmit request Indicator Channel (PHICH), a PHICH group number, to which the PHICH belongs, may be decided according to the following equation, $$n_{PHICH}^{group}=(I_{PRB_RA}^{lowest_index}+n_{DMRS}+n_{offset}^{DL})\bmod N_{PHICH}^{group}+I_{PHICH}N_{PHICH}^{group}$$

and/or an orthogonal sequence index applied to the PHICH may be decided according to the following equation, $$n_{PHICH}^{seq}=(\lfloor I_{PRB_RA}^{lowest_index}/N_{PHICH}^{group}\rfloor+n_{DMRS}+n_{offset}^{DL})\bmod 2N_{SF}^{group}$$

where, $I^{lowest_index}_{PRB_RA}$ indicates a minimum Physical Resource Block (PRB) index in a first slot used in the uplink transmission, $I_{PHICH}$ is set to 1 for a time division duplex (TDD) uplink/downlink configuration 0 performing the uplink transmission at a subframe n=4 or 9 and to 0 for the other configurations, $N^{group}_{PHICH}$ indicates the number of PHICH groups configured by an upper layer, $n_{DMRS}$ is a value indicating a cyclic shift applied to a DeModulation Reference Signal (DMRS) for the uplink transmission, and $N^{PHICH}_{SF}$ indicates a spreading factor used in PHICH modulation.

In the respective aspects of the present invention, the ACK/NACK channel may be a Hybrid automatic retransmission request Feedback A-MAP (HF-A-MAP) channel in a HF-A-MAP region, and a resource index of the HF-A-MAP channel may be decided according to the following equation, $$k=(M(j)+n+n_{offset}^{DL})\bmod N_{HF\text{-}A\text{-}MAP}$$

where, $N_{HF\text{-}A\text{-}MAP}$ indicates a total number of HF-A-MAP channels configured per HF-A-MAP region, and j indicates an HF-A-MAP index parameter in a non-user specific A-MAP IE.

In the respective aspects of the present invention, in allocating the ACK/NACK signal to the at least one node, the ACK/NACK signal may be allocated to a node different from a node from which another ACK/NACK signal to uplink transmission of another user equipment transmitted from the same time and frequency resources as in uplink transmission, which is a subject of the ACK/NACK signal, is transmitted.

In the respective aspects of the present invention, the ACK/NACK channel group, with which the ACK/NACK signal is multiplexed, and the spreading sequence used to spread the ACK/NACK signal may be decided according to the following equation, $$n_{PHICH}^{group}=(I_{PRB_RA}^{lowest_index}+n_{DMRS})\bmod N_{PHICH}^{group}+I_{PHICH}N_{PHICH}^{group}$$

$$n_{PHICH}^{seq}=(\lfloor I_{PRB_RA}^{lowest_index}/N_{PHICH}^{group}\rfloor+n_{DMRS})\bmod 2N_{SF}^{group}$$

where, $n^{group}_{PHICH}$ indicates an ACK/NACK channel group number, $n^{seq}_{PHICH}$ indicates an index of the spreading sequence, $I^{lowest_index}_{PRB_RA}$ indicates a minimum Physical Resource Block (PRB) index in a first slot used in the uplink transmission, $I_{PHICH}$ is set to 1 for a time division duplex (TDD) uplink/downlink configuration 0 performing the uplink transmission at a subframe n=4 or 9 and to 0 for the other configurations, $N^{group}_{PHICH}$ indicates the number of ACK/NACK channel groups configured by an upper layer, $n_{DMRS}$ is a value indicating a cyclic shift applied to a DeModulation Reference Signal (DMRS) for the uplink transmission, and $N^{PHICH}_{SF}$ indicates a spreading rate used to spread the ACK/NACK signal.

In the respective aspects of the present invention, the ACK/NACK signal may be allocated to a node different from another node corresponding to another ACK/NACK signal for different uplink transmission having the same $I^{lowest_index}_{PRB_RA}$ and $n_{DMRS}$.

The aforementioned technical solutions are only a part of the embodiments of the present invention, and various modifications to which technical features of the present invention are applicable will be understood by those of ordinary skill in the art to which the present invention pertains, based on the following detailed description of the present invention.

Advantageous Effects

According to the present invention, it is possible to reduce signal interference between a plurality of user equipments generated during uplink transmission and/or downlink transmission as control information or data for the plurality of user equipments are multiplexed to the same resource in multi-node or multi-cell coordinated communication or multi-user MIMO transmission.

According to the present invention, ACK/NACK signal interference between a plurality of user equipments is reduced, and therefore, it is possible to improve reliability of ACK/NACK signal transmission.

It will be appreciated by persons skilled in the art that the effects that could be achieved with the present invention are not limited to what has been particularly described hereinabove and other advantages of the present invention will be more clearly understood from the following detailed description taken in conjunction with the accompanying drawings.

BEST MODE

Figure 1:
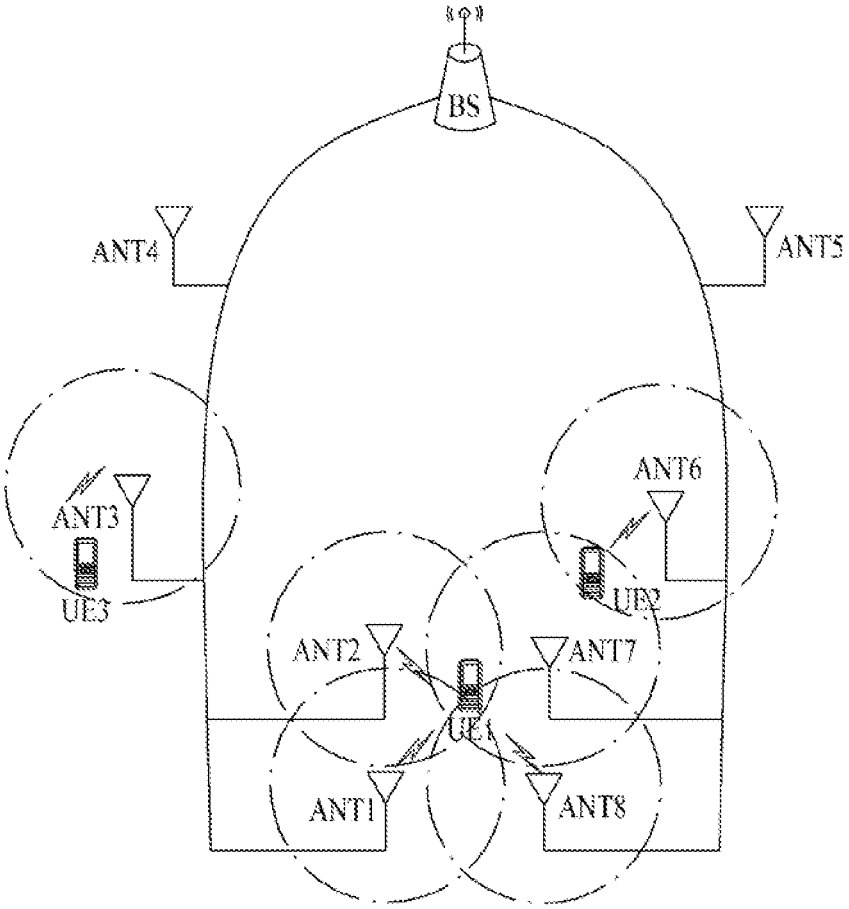
FIG. 1 is a view showing an example of a DAS structure to which the present invention is applied.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment through which the present invention can be carried out. The following detailed description includes detailed matters to provide full understanding of the present invention. However, it will be apparent to those skilled in the art that the present invention can be carried out without the detailed matters. For example, a case in which a mobile communication system will be described as being a 3GPP LTE system or an IEEE 802.16m system in the following detailed description. Except for matters unique in 3GPP LTE or IEEE 802.16m, however, the present invention may be applied to other arbitrary mobile communication systems.

In some cases, in order to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

A wireless communication system, to which the present invention is applied, includes at least one base station (BS) 11. Each base station provides a communication service to a user equipment (UE) located at a specific geographical region (generally referred to as a cell). The user equipment may be fixed or movable. The user equipment may include various devices that communicate with a base station to transmit and receive user data and/or various kinds of control information. The user equipment may be referred to as a Terminal Equipment (TE), a Mobile Station (MS), a Mobile Terminal (MT), a User Terminal (UT), a Subscriber Station (SS), a wireless device, a Personal Digital Assistant (PDA), a wireless modem, or a handheld device. The base station is a fixed station that performs communication with a user equipment and/or another base station and exchanges various kinds of data and control information with the user equipment and another base station. The base station may be referred to by other terms such as an evolved-NodeB (eNB), a Base Transceiver System (BTS), an Access Point (AP), and a processing server (PS).

A cell region, to which the base station provides a service, may be divided into a plurality of smaller regions in order to improve system performance. Each smaller region may be referred to as a sector or a segment. A Cell Identity (Cell_ID or IDCell) is given based on the entire system, whereas a sector or segment identity is given based on a cell region, to which the base station provides a service. Generally, user equipments may be distributed in a wireless communication system in a state in which the user equipments are fixed or movable. Each user equipment may communicate with one or more base stations through an Uplink (UL) and a Downlink (DL) at an arbitrary moment.

The present invention may be applied to various kinds of multi-node systems. For example, embodiments of the present invention may be applied to a distributed antenna system (DAS), a macro node having low-power RRHs, a multi-base station coordinated system, a pico- or femto-cell coordinated system, and a combination thereof. In a multi-node system, one or more base stations connected to a plurality of nodes may be coordinated to simultaneously transmit a signal to a user equipment or simultaneously receive a signal from the user equipment.

The DAS uses a plurality of distributed antennas connected to a base station or a base station controller, which manages a plurality of antennas spaced apart from each other by a predetermined distance or more in an arbitrary geographical region (also referred to as a cell), through a cable or a dedicated line in order to perform communication. In the DAS, each antenna or each antenna group may be a node of the multi-node system according to the present invention. Each antenna of the DAS may serve as a subset of antennas provided at the base station or the base station controller. That is, the DAS is a kind of multi-node system, and a distributed antenna or antenna group is a kind of node in a multi-antenna system. The DAS is different from a centralized antenna system (CAS), in which a plurality of antennas is concentrated at the center of a cell, in that a plurality of antennas provided at the DAS is spaced apart from each other by a predetermined distance in a cell. The DAS is different from a femto- or pico-cell coordinated system in that all antennas located in a cell are not managed by a distributed antenna or a distributed antenna group but are managed by a base station or a base station controller at the center of the cell. Also, the DAS is different from an ad-hoc network or a relay system which uses a base station connected to a relay station (RS) in a wireless fashion in that distributed antennas are connected to each other via a cable or a dedicated line. Also, the DAS is different from a repeater which simply amplifies and transmits a signal in that a distributed antenna or a distributed antenna group transmits a signal different from another distributed antenna or another distributed antenna group to a user equipment located adjacent to a corresponding antenna or a corresponding antenna group according to a command from a base station or a base station controller.

The respective nodes of the multi-base station coordinated system or the femto- or pico-cell coordinated system serve as independent base stations and cooperate with each other. Consequently, each base station of the multi-base station coordinated system or the femto- or pico-cell coordinated system may be a node of the multi-node system according to the present invention. The multiple nodes of the multi-base station coordinated system or the femto- or pico-cell coordinated system are connected to each other through a backbone network and perform scheduling and/or handover together, thereby performing coordinated transmission or reception. A system in which a plurality of base station participate in coordinated transmission as described above may be referred to as a Coordinated Multi-Point (CoMP) system.

Various kinds of multi-node systems, such as the DAS, the macro node having low-power RRHs, the multi-base station coordinated system, and the pico- or femto-cell coordinated system, are different from each other. However, since these systems are different from a single-node system (for example, the CAS, the conventional MIMO system, the conventional relay system, the conventional repeater system, etc.), and a plurality of nodes of these systems are coordinated to participate in providing a communication service to a user equipment, embodiments of the present invention may be applied to all of these systems. Hereinafter, the present invention will be described mainly based on the DAS as an example for the convenience of description. However, the following description is merely an illustration. Also, an antenna or an antenna group of the DAS may correspond to a node of another multi-node system, and a base station of the DAS may correspond to one or more coordinated base stations of another multi-node system. Consequently, the present invention may also be applied to another multi-node system in the same manner.

FIG. 1 is a view showing an example of a DAS structure to which the present invention is applied. A base station shown in FIG. 1 may include a plurality of antennas located at the center of a cell according to a CAS. For the convenience of description, however, only DAS antennas are shown in FIG. 1.

Referring to FIG. 1, a DAS, in which a plurality of antennas connected to a single base station located in a cell in a wired fashion is distributed at various positions in the cell, may be variously implemented according to the number and position of the antennas. For example, a plurality of antennas may be distributed at predetermined intervals in the cell, or two or more antennas may be located at a specific position in a dense state. In the DAS, in a case in which coverages of the distributed antennas overlap irrespective of the form in which the distributed antennas are located in the cell, it is possible to transmit a signal having rank 2 or more. For reference, rank indicates the number of transmission layers (3GPP LTE term) or the number of transmission streams (IEEE 802.16 term) that can be simultaneously transmitted through one or more antennas. For example, for spatial multiplexing in SU-MIMO, rank may be defined as the number of transmission layers or the number of transmission streams that can be used by a user allocated to a predetermined resource region. Spatial multiplexing serves to simultaneously transmit different signals using one or more antennas. For reference, a transmission layer or a transmission stream is an output value of a layer mapper 303 and means an information path input to a precoder. A transmission layer or a layer is a term used in 3GPP. In IEEE 802.16, an information path input to a precoder 304 is referred to as a transmission stream, or an MIMO stream, or a data stream. In IEEE 802.16, on the other hand, an MIMO layer is an information path input to an MIMO encoder corresponding to the layer mapper 303 in IEEE 802.16. In IEEE 802.16, an MIMO layer represents a channel coding block.

Referring to FIG. 1, a base station serving a cell region is connected to a total of 8 antennas in a wired fashion. The respective antennas may be located in the cell at regular intervals having a predetermined distance or more or at various intervals. In the DAS, it is not necessary to use all of the antennas connected to the base station. A proper number of antennas may be used based on a signal transmission range of each antenna, a degree of coverage overlap of neighboring antennas, an interference effect between neighboring antennas, and the distance between each antenna and a mobile user equipment.

For example, in a case in which three user equipments (UE1 to UE3) are located in the cell, and UE1 is located within signal transmission ranges of ANT1, ANT2, ANT7, and ANT8, as shown in FIG. 1, UE1 may receive a signal from at least one from among ANT1, ANT2, ANT7, and ANT8. On the other hand, the distance between UE1 and ANT3, ANT4, ANT5, and ANT6 is great with the result that path loss may occur, and power consumption may increase. Also, signals transmitted from ANT3, ANT4, ANT5, and ANT6 may be negligible.

As another example, UE2 is located at a portion at which signal transmission ranges of ANT 6 and ANT7 overlap with the result that signals transmitted through the other antennas are negligible except ANT 6 and ANT7. UE3 is located within a distance close to ANT3, and therefore, only a signal transmitted from ANT 3, of signals transmitted from ANT 1 to ANT8, is dominant.

In a case in which a plurality of antennas is spaced apart from each other in the cell, as shown in FIG. 1, the DAS may be operated as an MIMO system. The base station may communicate with UE1 through antenna group 1 including at least one from among ANT1, ANT2, ANT7, and ANT8. At the same time, the base station may communicate with UE2 through antenna group 2 including at least one from among ANT6 and ANT7. At the same time, the base station may communicate with UE3 through ANT5. At this time, ANT 4 and ANT5 may perform transmission for UE3 and UE2, respectively, or may be turned off.

That is, when the DAS communicates with a single user or a plurality of users, various numbers of data streams may be transmitted to each user equipment, and the antenna or the antenna group assigned to each mobile user equipment located in the cell served by the base station may be variously present. Based on the position of each mobile user equipment located in the cell, the antenna or the antenna group performing communication with the corresponding user equipment may be specified but may be adaptively changed depending upon movement of each mobile user equipment in the cell.

Figure 2:
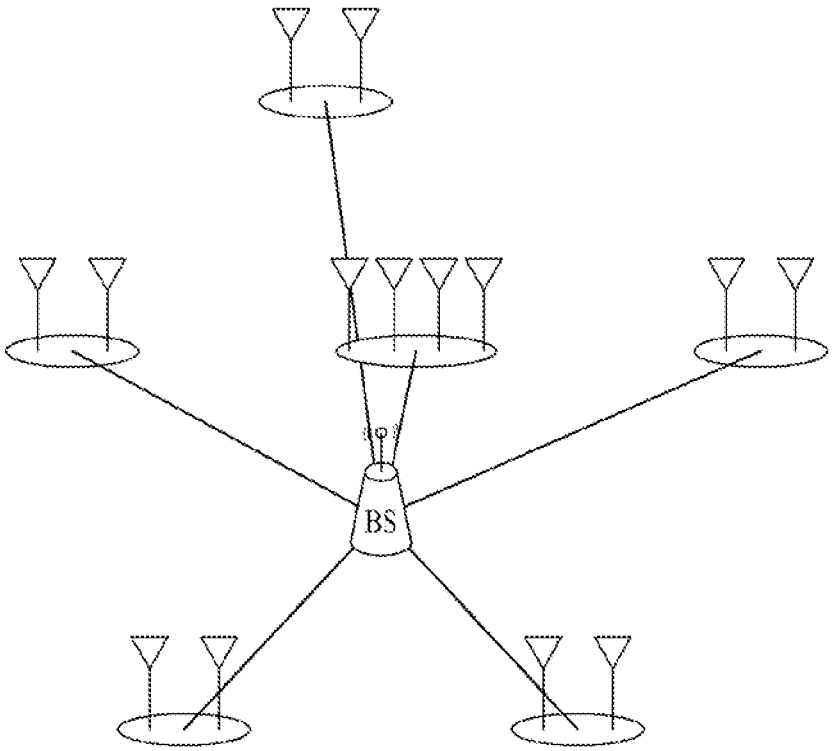
FIG. 2 is a view showing an example of a DAS configuration to which the present invention is applied.

FIG. 2 is a view showing an example of a DAS configuration to which the present invention is applied.

Referring to FIG. 2, the DAS includes a base station and antenna nodes connected to the base station. The antenna nodes are connected to the base station in a wired/wireless fashion. Each of the antenna nodes may include one to several antennas. Generally, antennas belonging to one antenna node have characteristics that the distance between the nearest antennas is less than a few meters, and therefore, the antennas belong to the same regional spot. An antenna node may also be referred to as an antenna cluster.

Figure 3:
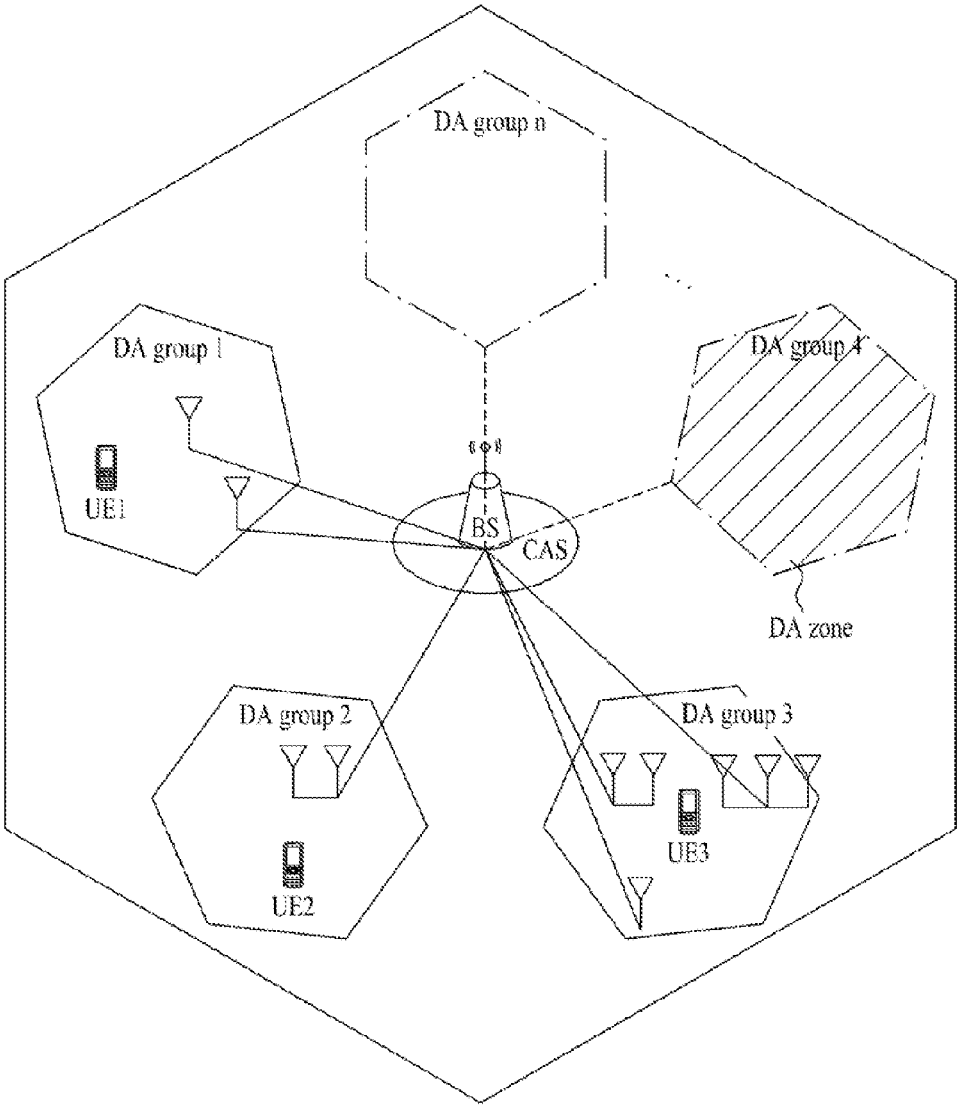
FIG. 3 is a view showing another example of the DAS configuration to which the present invention is applied.

FIG. 3 is a view showing another example of the DAS configuration to which the present invention is applied. Specifically, FIG. 3 shows an example of a system structure in a case in which a DAS is applied to centralized antenna system using conventional cell-based multi antennas.

Referring to FIG. 3, a plurality of centralized antennas (CAs), the distance between the antennas is less than the radius of a cell, and therefore, the antennas exhibit similar path loss effects, may be located at a region adjacent to a base station according to an embodiment of the present invention. Also, a plurality of distributed antennas (DAs), in which the distance between the antennas is equal to or greater than a predetermined value and is greater than the distance between the CAs, and therefore, the antennas exhibit different path loss effects, may be located in the cell region.

Each DA includes one or more antennas connected to the base station in a wired fashion. Each DA may have the same meaning as an antenna node for DAS or an antenna node. One or more DAs form a DA group, thereby forming a DA zone.

A DA group includes one or more DAs. The DA group may be variably configured depending upon the position or reception state of a user equipment or may be fixedly configured with the maximum number of antennas used in MIMO. A DA zone is defined as a range within which antennas constituting a DA group can transmit or receive a signal. The cell region shown in FIG. 3 includes n DA zones. A user equipment belonging to each DA zone may perform communication with one or more of the DAs constituting the DA zone. Upon transmitting signals to user equipments belonging to DA zones, the base station may simultaneously use DAs and CAs, thereby improving a transmission rate.

FIG. 3 shows a CAS structure using the conventional multi antennas in which the CAS includes a DAS so that a base station and user equipments uses the DAS. The positions of CAs and DAs are shown as being divided from each other for simplicity of description. However, the positions of CAs and DAs are not limited thereto. The CAs and DAs may be variously positioned in different embodiments.

FIG. 3 shows a CAS structure using the conventional multi antennas in which the CAS includes a DAS so that a base station and user equipments uses the DAS. The positions of CAs and DAs are shown as being divided from each other for simplicity of description. However, the positions of CAs and DAs are not limited to the example illustrated in FIG. 3. The CAs and DAs may be variously positioned in different embodiments.

As shown in FIGS. 1 to 3, an antenna or an antenna node supporting each user equipment may be defined. Particularly upon transmitting downlink data, different data for each antenna or each antenna node may be transmitted for different user equipments through the same time and frequency resources. This is a kind of MU-MIMO operation to transmit different data streams for each antenna or each antenna node through selection of the antennas or the antenna nodes.

In the present invention, each antenna or each antenna node may be replaced by an antenna port, which is a logical antenna concept implemented by a physical transmit antenna or a combination of a plurality of physical transmit antenna elements.

Figure 4:
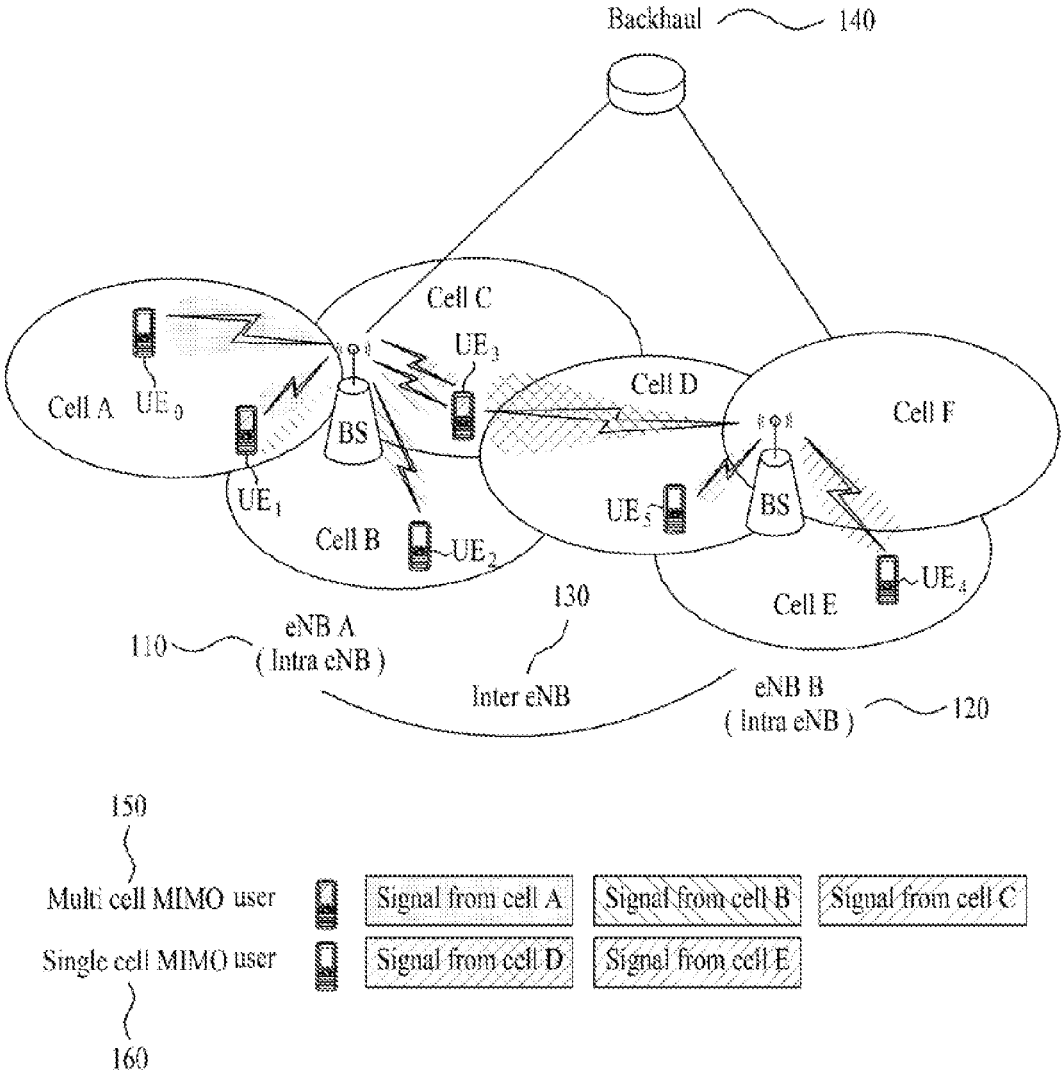
FIG. 4 is a view conceptually showing a Coordinated Multi-Point (CoMP) between a macro base station and another macro base station or between a femto-/pico-cell base station and a macro base station.

FIG. 4 is a view conceptually showing a Coordinated Multi-Point (CoMP) between a macro base station and another macro base station or between a femto- or pico-cell base station and a macro base station.

A wireless communication system performing the CoMP includes at least two base stations (BSs). The respective base stations 110, 120, and 130 provide communication services to user equipments (UEs) located in specific geographical regions (generally referred to as cells) Cell A, Cell B, . . . , and Cell F.

In a Multi Cell environment, there are intra base stations 110 and 120 and an inter base station 130. Each of the intra base stations includes several cells (or sectors). Cells sharing the same base station with a cell to which a specific user equipment belongs are cells corresponding to the intra base stations 110 and 120 with respect to the cell to which the specific user equipment belongs. On the other hand, cells belonging to base stations different from the cell to which the specific user equipment belongs are cells corresponding to the inter base station 130 with respect to the cell to which the specific user equipment belongs. Meanwhile, the intra base station may be referred to as a serving base station with respect to a specific cell, and the inter base station may be referred to as a neighboring base station with respect to the specific cell. In this way, cells based on the same base station with the specific cell transmit and receive information (for example, Channel Quality Control Information) through an X2 interface. On the other hand, cells based on different base stations may transmit and receive information through a backhaul 140.

In the CoMP system, a serving base station and at least one coordinated base station are connected to a scheduler through a backhaul network. Channel information regarding channel status between each user equipment and the coordinated base station measured by each base station may be fed back to the scheduler through the backhaul network, and then the scheduler may be operated. For example, the scheduler schedules information for a coordinated MIMO operation with respect to the serving base station and the at least one coordinated base station. That is, the scheduler may directly command a coordinated MIMO operation to each base station.

As shown in FIG. 4, a single cell MIMO user 160 may communicate with a base station in a cell (sector), and a multi cell MIMO user 150 at a cell interface may communicate with a plurality of base stations in a plurality of cells (sectors). For example, a single cell MIMO user 160 (UE0) may communicate with eNB A in cell A, a single cell MIMO user 160 (UE2) may communicate with eNB A in cell B, a single cell MIMO user 160 (UE4) may communicate with eNB B in cell E, and a single cell MIMO user 160 (UE5) may communicate with eNB B in cell D. On the other hand, a multi cell MIMO user 150 (UE1) may communicate with eNB A in cell A and cell C, and a multi cell MIMO user 150 (UE3) may communicate with eNB A in cell B and cell C while communicating with eNB B in cell D. That is, the multi cell MIMO user 150 communicates with a base station through multi-node coordinated transmission. The CoMP applies improved MIMO transmission in a multi cell environment to reduce inter-cell interference in the multi cell environment, thereby improving throughput of a user equipment located at a cell interface.

The base stations shown in FIG. 4 are shown as antennas being located in the center of each cell according to the CAS for the convenience of description. On the other hand, CoMP may be performed between DAS base stations in which a plurality of antennas connected to a single base station in a wired fashion is distributed at various positions in a cell or between a DAS base station and a CAS base station.

Hereinafter, each antenna node of the DAS or each base station participating in CoMP will be referred as a 'node' or a 'coordinated node.' Also, DAS and multi base station coordination, femto- or pico-cell coordination, and multi cell coordination will be referred to as multi node coordination. Nodes participating in multi-node coordinated communication may simultaneously perform communication using the same wireless resource, and may simultaneously support at least one user equipment using the same wireless resource. Generally, antennas belonging to a node have characteristics that the distance between the nearest antennas is less than a few meters, and therefore, the antennas belong to the same regional spot. Also, a node serves as an access point which a user equipment can access. Using the abovementioned DAS and/or CoMP, each node simultaneously supports one or more user equipments using the same wireless frequency resource, thereby improving system performance.

Figure 5:
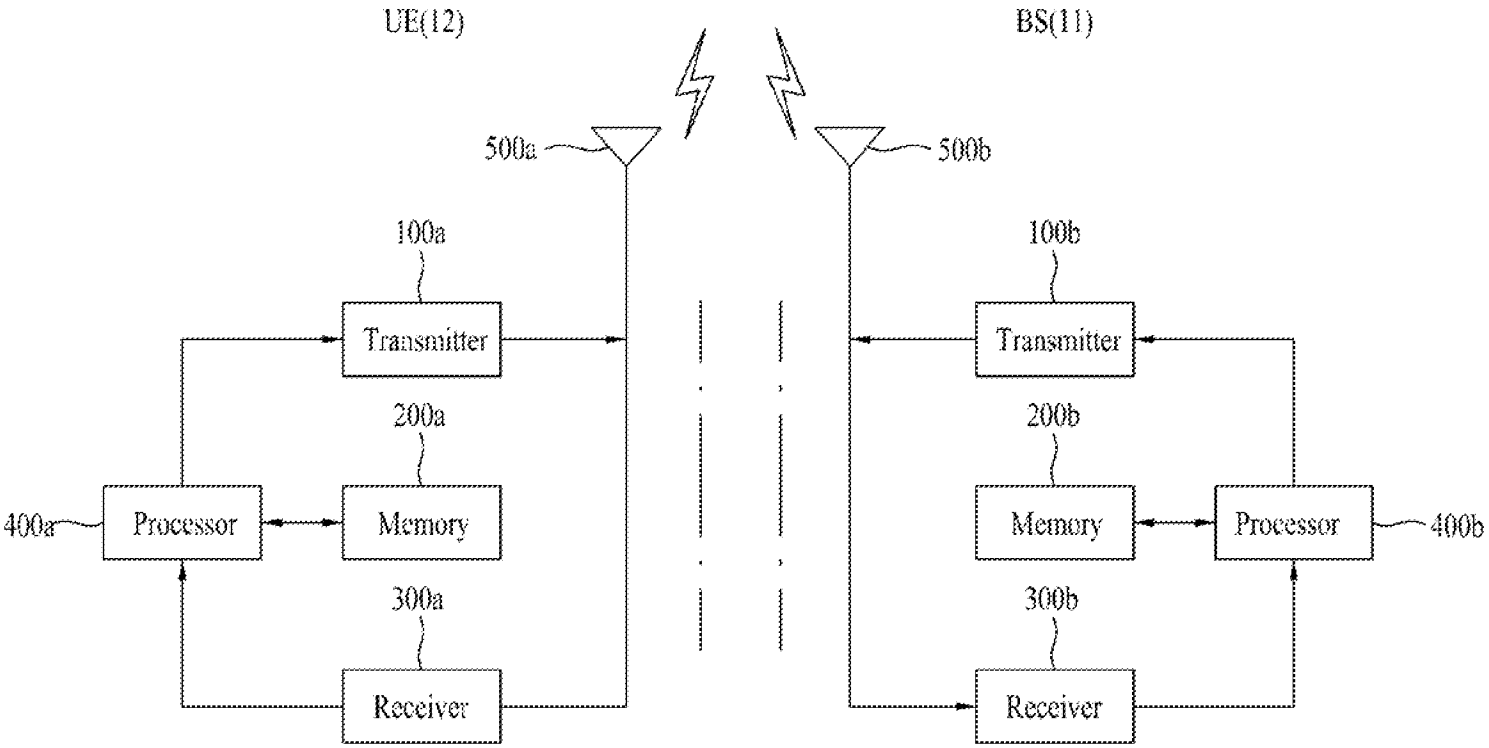
FIG. 5 is a block diagram showing components of a user equipment and a base station which implement the present invention.

FIG. 5 is a block diagram showing components of a user equipment and a base station which implement the present invention.

A user equipment (UE) 12 serves as a transmitting device on an uplink and as a receiving device on a downlink. On the other hand, a base station (BS) 11 may serve as a receiving device on the uplink and as a transmitting device on the downlink.

The user equipment 12 and the base station 11 include antennas 500a and 500b to receive information and/or data, signals, and messages, transmitters 100a and 100b to transmit messages by controlling the antennas 500a and 500b, receivers 300a and 300b to receive messages by controlling the antennas 500a and 500b, and memories 200a and 200b to store various kinds of information associated with communication in a wireless communication system, respectively. Also, the user equipment 12 and the base station 11 further include processors 400a and 400b, respectively, which are configured to implement the present invention by controlling the components of the user equipment 12 and the base station 11, such as the transmitters, the receivers, and the memories. The transmitters 100a and 100b, the memories 200a and 200b, the receivers 300a and 300b, the processors 400a and 400b, and the antennas 500a and 500b in the user equipment 12 and the base station may cooperated with each other. The transmitter 100a, the receiver 300a, the memory 200a, and the processor 400a in the user equipment 12 may be configured as independent components on separate chips or their separate chips may be incorporated into a single chip. In the same manner, the transmitter 100b, the receiver 300b, the memory 200b, and the processor 400b in the base station 11 may be configured as independent components on separate chips or their separate chips may be incorporated into a single chip. A transmitter and a receiver may be configured as a single transceiver in the user equipment or the base station. The antennas 500a and 500b serve to transmit signals generated from the transmitters 100a and 100b to the outside, or to transfer radio signals received from the outside to the receivers 300a and 300b. A transceiver module supporting a Multiple Input Multiple Output (MIMO) function to transmit and receive data using a plurality of antennas may be connected to two or more antennas.

The processors 400a and 400b generally control overall operations of various modules of the user equipment 12 and the base station 11. Especially, the processors 400a and 400b may carry out various control functions to implement the present invention, a Medium Access Control (MAC) frame variable control function based on service characteristics and a propagation environment, a power saving mode function to control idle-mode operations, a handover function, and an authentication and encryption function. The processors 400a and 400b may also be referred to as controllers, microcontrollers, microprocessors, microcomputers, etc. Meanwhile, the processors 400a and 400b may be configured as hardware, firmware, software, or a combination thereof. In a hardware configuration, the processors 400a and 400b may be provided with one or more Application Specific Integrated Circuits (ASICs), Digital Signal Processors (DSPs), Digital Signal Processing Devices (DSPDs), Programmable Logic Devices (PLDs), or Field Programmable Gate Arrays (FPGAs), which is configured to implement the present invention. On the other hand, in a firmware or software configuration, firmware or software may be configured to include a module, a procedure, or a function, which performs functions or operations of the present invention. The firmware or software configured to implement the present invention may be provided in the processors 400a and 400b, or may be stored in the memories 200a and 200b so that the firmware or software can be driven by the processors 400a and 400b.

The transmitters 100a and 100b perform predetermined coding and modulation with respect to signals and/or data, which are scheduled by the processors 400a and 400b or schedulers connected to the processors 400a and 400b and transmitted to the outside, and then transfer the modulated signals and/or data to the antennas 500a and 500b. For example, the transmitters 100a and 100b convert a transmission data stream into K signal trains by demultiplexing, channel coding, modulation, etc. The K signal trains are transmitted through the antennas 500a and 500b after being processed in transmission processors of the transmitters. The transmitters 100a and 100b and the receivers 300a and 300b of the user equipment 12 and the base station 11 may be configured in different manners depending on procedures of processing transmitted signals and received signals.

Figure 6:
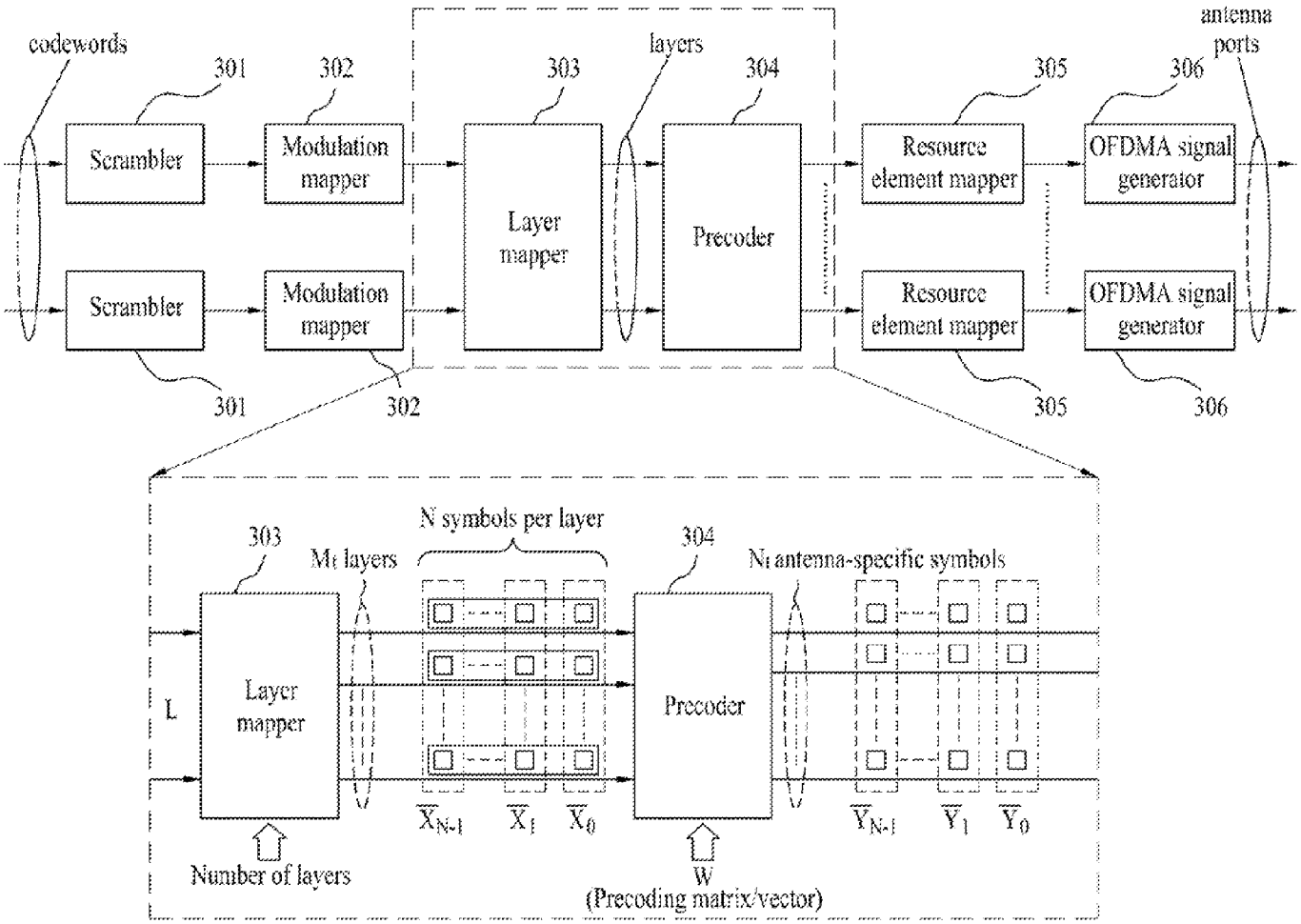
FIG. 6 is a view showing an Orthogonal Frequency Division Multiple Access (OFDMA) type signal processing procedure.

FIG. 6 is a view showing an Orthogonal Frequency Division Multiple Access (OFDMA) type signal processing procedure.

A transmitter in a user equipment or a base station may transmit one or more codewords. The one or more codewords may be scrambled by scramblers 301 and may be modulated as complex symbols by modulation mappers 302. A layer mapper 303 maps the complex symbols to one or more transmission layers, for example, $M_t$ layers. For example, the layer mapper 303 may map N complex symbols per layer.

According to IEEE 802.16, the layer mapper 303 may be implemented as an MIMO encoder (not shown). The MIMO encoder may encode one or more data trains to be transmitted using a predetermined coding method to form coded data, and may modulate the coded data to arrange the coded data as symbols to express positions on signal constellation. A data train is an information path input to the MIMO encoder. A data train indicates a channel coding block. According to IEEE 802.16, an information path input to the MIMO encoder is referred to as an MIMO layer. Meanwhile, the MIMO encoder may define layers of input symbols so that the precoder 304 can distribute a specific symbol of an antenna to the path of the corresponding antenna. That is, the MIMO encoder maps L MIMO layers into $M_t$ MIMO streams. The MIMO encoder is a batch processor to simultaneously process M input symbols. The M input symbols may be expressed as an M×1 vector as follows.

$$s = \begin{bmatrix} s_1 \\ s_2 \\ \dots \\ s_M \end{bmatrix} \quad \text{Equation 1}$$

Where, Si indicates an n-th input symbol of a batch. One or more successive symbols may belong to an MIMO layer. A procedure of mapping the input symbols from MIMO layers to MIMO streams is first performed in a spatial dimension. Output of the MIMO encoder, which serves as an input of the precoder 304, may be expressed as an $M_t \times N_F$ MIMO STC matrix as follows.

$$x = S(s) \quad \text{Equation 2}$$

Where, $M_t$ indicates the number of MIMO streams, $N_F$ indicates the number of subcarriers occupied by an MIMO block, x indicates an output of the MIMO encoder, s indicates an input MIMO layer vector, s( ) indicates a function to map the input MIMO layer vector to an STC matrix, and S(s) indicates an STC matrix.

The STC matrix x may be expressed as follows.

$$x = \begin{bmatrix} x_{1,1} & x_{1,2} & \cdots & x_{1,N_F} \\ x_{2,1} & x_{2,2} & \cdots & x_{2,N_F} \\ \cdots & \cdots & \cdots & \cdots \\ x_{M_t,1} & x_{M_t,2} & \cdots & x_{M_t N_F} \end{bmatrix} \quad \text{Equation 3}$$

The MIMO encoder may use various coding methods, such as SFBC, vertical encoding, multi-layer encoding, and CDR.

The precoder 304 multiplies complex symbols of a transmission layer by a predetermined precoding matrix selected according to channel status, for example, a $N_t \times M_t$ precoder matrix W, and outputs the multiplication result as complex symbols for $N_t$ antennas. The output of the precoder 304 may be expressed as a $N_t \times N_F$ matrix as follows.

$$z = Wx = \begin{bmatrix} z_{1,1} & z_{1,2} & \cdots & z_{1,N_F} \\ z_{2,1} & z_{2,2} & \cdots & z_{2,N_F} \\ \cdots & \cdots & \cdots & \cdots \\ z_{N_t,1} & z_{N_t,2} & \cdots & z_{N_t,N_F} \end{bmatrix} \quad \text{Equation 4}$$

Where, $N_t$ indicates the number of transmit antennas, and $Z_{j,k}$ indicates an output symbol to be transmitted on a k-th subcarrier through a j-th antenna. The precoder 304 may use both a codebook method and a non-codebook method.

The complex symbols for each antenna are mapped to time-frequency resource elements used in transmission by resource element mappers 305. The resource element mappers 305 may also be referred to as subcarrier mappers.

The complex symbols for each antenna mapped to time-frequency resource elements are modulated by the OFDMA signal generator 306 using an OFDMA method and are transmitted to the respective antenna or the respective antenna ports in the form of OFDMA symbols (also referred to as OFDM symbols) for each antenna or each antenna port. The OFDMA signal generator 306 may perform Inverse Fast Fourier Transform (IFFT) with respect to the input symbols. A cyclic prefix (CP) may be inserted into time domain symbols upon which IFFT has been performed. The OFDMA symbols are transmitted through the respective antennas.

In 3GPP LTE and IEEE 802.16, similar terms may designate different objects. Hereinafter, an information path input to the layer mapper 303 will be referred to as an MIMO layer, and an information path output from the layer mapper 303 will be referred to as a data stream, in order to prevent confusion and for the convenience of description.

Although, in FIG. 6, the signal processing procedure using the Orthogonal Frequency Division Multiple Access (OFDMA) method is described as an example, a user equipment may process an uplink signal using a Single Carrier Frequency Division Multiple Access (SC-FDMA) method and may transmit the processed uplink signal to a base station. AN SC-FDMA type transmitter may include a scrambler 301, a modulation mapper 302, a precoder 304, and a resource element mapper 305. The scrambler 301 of the user equipment scrambles a transmission signal using a specific scrambling signal of the user equipment. The modulation mapper 302 modulates the scrambled signal into a complex symbol using BPSK, QPSK, or 16 QAM according to the kind of the transmission signal and/or channel status. The modulated complex symbol is precoded by the precoder 304, and is mapped to a time-frequency resource element to be used in real transmission by the resource element mapper 305. The signal mapped to the resource element may be transmitted to the base station through the antenna in the form of an SC-FDMA signal. The user equipment adopting the SC-FDMA signal processing method may include an SC-FDMA signal generator to convert the signal mapped to the resource element into an SC-FDMA signal.

Although the OFDMA method is mainly used for downlink transmission since it is possible to increase frequency efficiency and cell capacity, the OFDMA method may also be used for uplink transmission. The user equipment may be configured to adopt both the OFDMA method and the SC-FDMA signal processing method. Also, the user equipment may be designed so that the both methods can be switched according to a channel environment.

Although, in FIG. 6, the scramblers 301, the modulation mappers 302, the layer mapper 303, the precoder 304, the resource element members 305, the OFDM signal generators 306 are described as being included in the transmitters 100a and 100b, the processors 400a and 400b may be designed to include the above operational modules. The transmitters 100a and 100b may modulate OFDMA symbol signals into radio frequency (RF) signals and may transmit the modulated signals to the antennas 500a and 500b. The antennas 500a and 500b of the receiving device may receive the RF signals and may transmit the received RF signals to the receivers 300a and 300b. The receivers 300a and 300b may modulate the RF signals into OFDMA symbol signals and may provide the modulated signals to the processors 400a and 400b.

Figure 7:
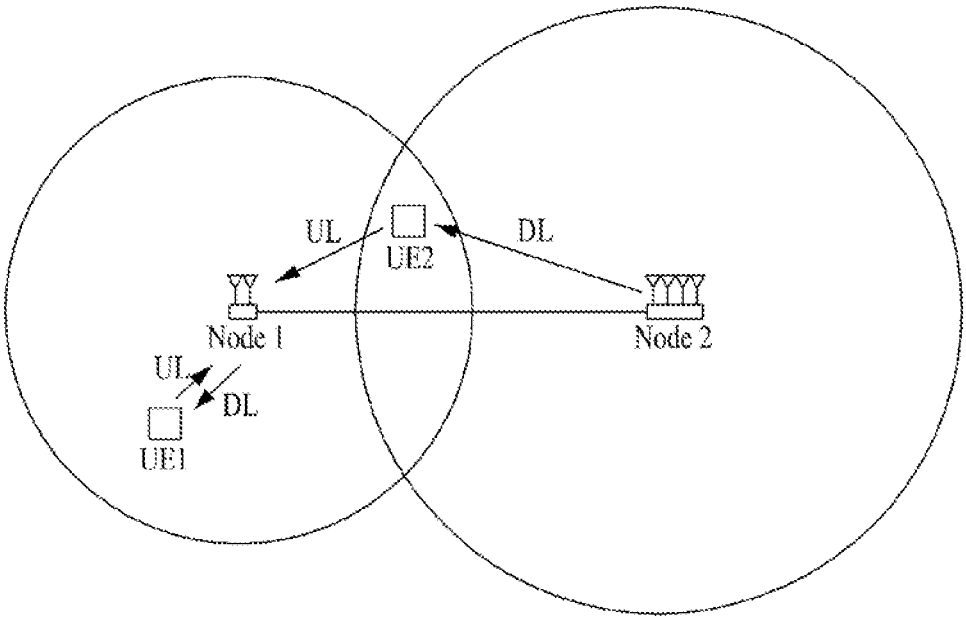
FIG. 7 is a view showing an example of uplink/downlink transmission and reception in multi-node coordinated communication.

FIG. 7 is a view showing an example of uplink/downlink transmission and reception in multi-node coordinated communication.

In a multi-node coordinated system, each user equipment may be connected to some coordinated nodes. Due to the amount of data required by user equipments with respect to each node and the difference in transmission power between each node and the user equipments, nodes to which the user equipments are connected during uplink may be different from nodes to which the user equipments are connected during downlink. For example, a certain user equipment may transmit an uplink signal to node A on an uplink and may receive a downlink signal from node B on a downlink. That is, during downlink or uplink signal transmission, different control information/data for each node may be transmitted for different user equipments through the same time and frequency resource. This is a kind of MU-MIMO operation to transmit different data streams for the nodes through selection of the nodes.

According to the current standard, the position of resource assigned to a user equipment at a downlink control channel automatically decides Hybrid Automatic Retransmit reQuest (HARQ) to a corresponding downlink signal and/or the position of an ACKnowlegement/Negative-ACKnowlegement (ACK/NACK) transmission channel. Hereinafter, HARQ to downlink transmission will be referred to as downlink HARQ, and ACK/NACK for the downlink HARQ will be referred to as uplink ACK/NACK. Also, HARQ to uplink transmission will be referred to as uplink HARQ, and ACK/NACK for the uplink HARQ will be referred to as downlink ACK/NACK.

For example, referring to FIG. 7, uplink and downlink transmission is performed between UE1 and Node 1. On the other hand, downlink transmission is performed from Node 2 to UE2, and uplink transmission is performed from UE2 to Node 2. This may occur in a case in which transmission power of Node 2 is greater than that of Node 1. In a case in which downlink control signals are transmitted to UE1 and UE2, to which Node 1 and Node 2 are downlink connected, on a downlink, through the same resource, UE1 and UE2 transmit ACK/NACK information to Node 1 through the same uplink resource according to the current standard. As a result, ACK/NACK transmitted from a plurality of user equipments may collide to each other, and therefore, interference between ACK/NACK transmission signals of the user equipments may occur.

Figure 8:
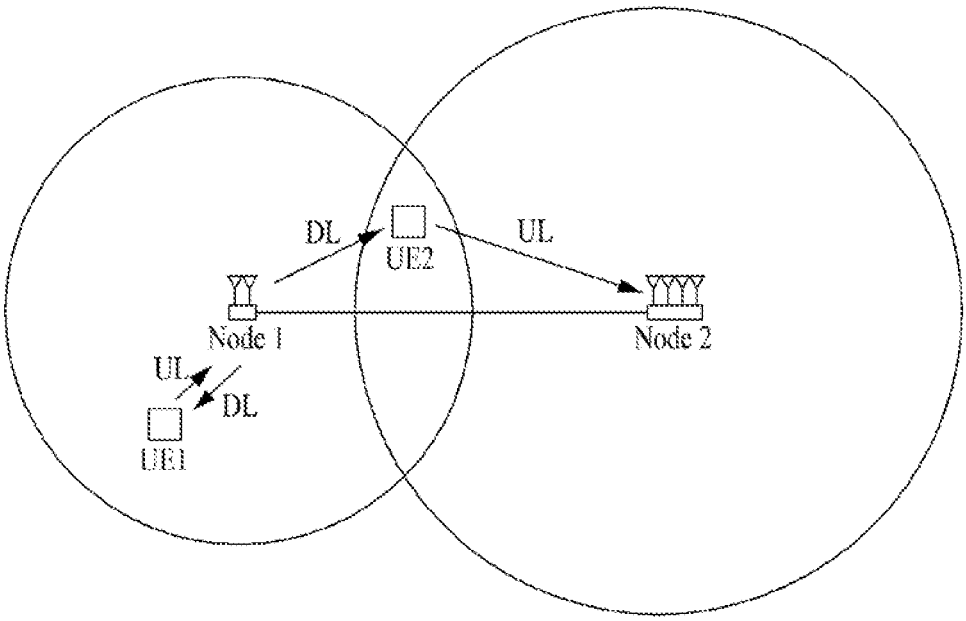
FIG. 8 is a view showing another example of uplink/downlink transmission and reception in multi-node coordinated communication.

FIG. 8 is a view showing another example of uplink/downlink transmission and reception in multi-node coordinated communication.

Interference between ACK/NACK transmission signals may occur at downlink ACK/NACK transmission for uplink data transmission as well as at uplink ACK/NACK transmission for downlink data transmission. According to the current standard, the position of a downlink ACK/NACK transmission channel for uplink data transmission is decided by the position of an uplink data transmission channel. If a plurality of user equipments transmits data (uplink MU-MIMO transmission) to a base station through the same resource region, therefore, downlink ACK/NACK transmission channels of user equipments sharing the same resource region collide with each other.

Referring to FIG. 8, for example, in a case in which uplink transmission is performed from UE1 to Node 1, and uplink transmission is performed from UE2 to Node 2, if Node 1 transmits downlink ACK/NACK information to both UE1 and UE2, ACK/NACK channels may overlap.

If user equipments sharing a downlink control channel also share an uplink control channel to transmit uplink ACK/NACK information to a specific node through the same resource region, or user equipments sharing an uplink data channel also share a downlink control channel to receive downlink ACK/NACK information from a specific node through the same resource region, it is not necessary to revise regulations of the current standard. However, in a case in which a plurality of user equipments transmits ACK/NACK information at the same resource or receives ACK/NACK information at the same resource according to the current standard, as previously described, accuracy of ACK/NACK information transmission may be lowered due to interference of ACK/NACK transmission. Since ACK/NACK transmission failure or error may lead to subsequent signal transmission failure or error, accurate transmission of ACK/NACK signals has a great influence on the overall performance of the communication system. In ACK/NACK transmission requiring high reliability unlike general data, therefore, it is preferable for a plurality of user equipments to share the same wireless resource. Consequently, it is necessary to provide a new ACK/NACK resource allocation rule different from the ACK/NACK resource allocation rule according to the current standard.

Hereinafter, new ACK/NACK transmission methods proposed by the present invention to prevent ACK/NACK transmission of a plurality of user equipments from colliding or overlapping at a predetermined resource region will be described.

ACK/NACK Transmission Method 1—New Resource Allocation Method of ACK/NACK

In order to reduce interference between ACK/NACK transmission signals, the present invention reflects user equipment specific values defined for user equipments in allocating a resource to an uplink/downlink ACK/NACK channel to a downlink/uplink channel. According to the current standard, transmission timing and transmission frequency of a downlink/uplink signal, which is a subject of ACK/NACK, automatically decide transmission timing and transmission frequency of an uplink/downlink ACK/NACK channel. On the other hand, an ACK/NACK transmission method 1 of the present invention reflects a value from an upper layer designated for each user equipment or an antenna index, an antenna port index, an antenna node index, or a node index assigned for each user equipment when allocating a resource of an ACK/NACK channel, i.e. when mapping the ACK/NACK channel to time and frequency resources. The base station processor 400b or the user equipment processor 400a is configured to reflect a value designated for each user equipment and to allocate a resource of an ACK/NACK channel. The resource element mapper 305 of the base station/the user equipment maps a corresponding ACK/NACK channel to a resource decided by reflecting the value designated for each user equipment under control of the processor 400b or 400a of the base station or the user equipment.

In order to vary transmission resources of uplink/downlink ACK/NACK information for user equipments assigned to the same downlink/uplink resource, a value defined based on at least one of the following items may be reflected in resource allocation or mapping of an uplink/downlink ACK/NACK channel.

(1) A Value Defined for Each User Equipment at an Upper Layer

This is a value from an upper layer, e.g. a Medium Access Control (MAC) layer. The upper layer may inform a user equipment or a base station of different values each user equipment through a MAC message. A resource of an ACK/NACK channel may be differently allocated according to a value defined by the upper layer for each user equipment.

(2) A Node Identifier Used in Downlink/Uplink Transmission

A resource of an ACK/NACK channel may be differently allocated according to a node, to which a downlink/uplink signal, which is a subject of ACK/NACK, has been transmitted.

An antenna index, an antenna node index, an antenna port index, a base station ID, a cell ID, etc. may be utilized as a node identifier of the present invention. For example, in the case of DAS, a value designating an antenna node having performed downlink transmission or uplink reception, which is a subject of ACK/NACK, of a plurality of antenna nodes connected to a base station may be used as node identifier information. For example, in the case of a CoMP, a value designating a base station ID or a cell ID and/or an antenna or an antenna port participating in a CoMP to a specific user equipment may be used as node identifier information. In a case in which the DAS and the CoMP are combined, a value designating a base station or a cell participating in CoMP and a value designating an antenna node or an antenna port having performed downlink transmission or uplink reception, which is a subject of ACK/NACK, of a plurality of antenna nodes may be used as node identifier information.

(3) Kind (Type, Group) Information of a Node which has been Used in Downlink/Uplink Transmission Information designating the type or group of a node having transmitted a downlink/uplink signal, which is a subject of ACK/NACK, may be reflected in resource allocation/mapping of an uplink/downlink ACK/NACK channel. The node kind information is information identifying whether a corresponding node is an antenna node of a DAS, a femto or pico base station, or a macro base station. For example, the antenna node of the DAS may be different from the femto or pico base station or the macro base station. As another example, the femto or pico base station and the macro base station may be different from each other. In grouping nodes based on coverage and kind of each node, node group information may be used.

(4) A Node Identifier to be Used in ACK/NACK Transmission

In multi-node coordinated communication, a node performing downlink transmission to a specific user equipment and a node performing uplink transmission to the specific user equipment may be different from each other. That is, a node having transmitting a downlink/uplink signal, which is a subject of ACK/NACK, and a node which will transmit ACK/NACK information may be different from each other. According to a node which will transmit an ACK/NACK channel, therefore, different resources may be assigned or mapped to the ACK/NACK channel. An antenna index, an antenna node index, a base station ID, a cell ID, etc. may be utilized as the node identifier.

(5) Kind (Type, Group) Information of a Node to be Used in ACK/NACK Transmission The kind of a node having transmitted a downlink/uplink signal, which is a subject of ACK/NACK, and the kind of a node which will transmit ACK/NACK information may be different from each other. According to the kind of a node which will transmit ACK/NACK channel, therefore, different resources may be assigned or mapped to the ACK/NACK channel. Information identifying whether a node is an antenna node of a DAS, a femto base station, or a macro base station may be utilized as node kind information. In grouping nodes based on coverage and kind of each node, node group information may be used.

(6) A Pattern Index of a Reference Signal Allocated for Each User Equipment

In a multi-node system, pattern indices of reference signals used in reception or transmission for each user equipment so that user equipment identify multiple nodes may be different from each other. The pattern indices may be allocated by a base station.

For example, a Cell-specific Reference Signal (CRS), a Channel Status Information Reference Signal (CSI-RS), a DeModulation Reference Signal (DMRS), midamble, pilot, etc. may be utilized as a reference signal. Generally, a reference signal of a different pattern is transmitted to a user equipment or a base station according to the number of data streams, the number of transmit antennas, a cell ID, or a node ID. Although uplink/downlink transmission is performed using the same resource, different resources may be allocated or mapped to an ACK/NACK channel according to the characteristics of a user equipment using different pilot pattern indices from different nodes.

(7) Multiplexing Sequence of a Resource Allocated in Downlink/Uplink Transmission A resource of an ACK/NACK channel may be differently allocated or mapped according to multiplexing sequence of a resource used to transmit a downlink/uplink signal, which is a subject of ACK/NACK. The multiplexing sequence of each user equipment may be confirmed through a codeword index, a data stream index, a transport block index, etc.

According to the current communication standard, timing and frequency resources of uplink ACK/NACK transmission are decided by the position of a resource used in downlink transmission, and timing and frequency resources of downlink ACK/NACK transmission are decided by the position of a resource used in uplink transmission. According to the ACK/NACK transmission method 1 of the present invention, on the other hand, a value specified for each user equipment is reflected in deciding the transmission position of ACK/NACK information. According to the ACK/NACK transmission method 1 of the present invention, therefore, ACK/NACK information of a plurality of user equipments can be transmitted through different resources even in downlink/uplink transmission, which causes ACK/NACK transmission, is performed with respect to the plurality of user equipments at the same resource. According to the ACK/NACK transmission method 1 of the present invention, therefore, it is possible to prevent ACK/NACK signal transmission between the user equipments from colliding or overlapping at the same resource, thereby improving reliability of ACK/NACK transmission.

In order to assist in understanding of the ACK/NACK transmission method 1 of the present invention, a case in which the transmission method 1 is applied to a 3GPP LTE standard and IEEE 802.16 will be described as an example. Even in other wireless communication standards, a value differently defined or allocated for each user equipment may be reflected in resource allocation or mapping of an ACK/NACK channel to improve reliability of ACK/NACK transmission.

[3GPP LTE-A]

Figure 9:
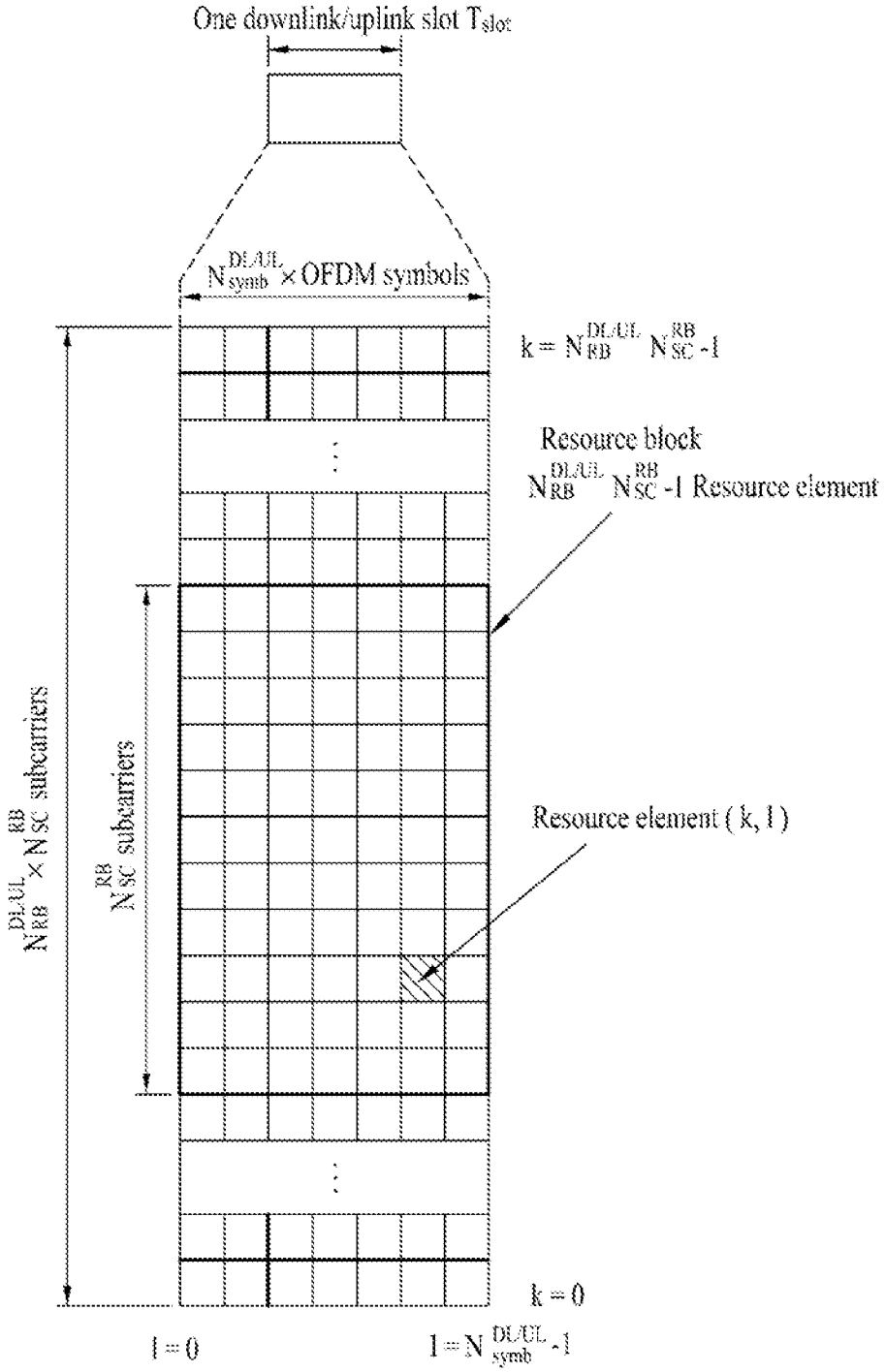
FIG. 9 is a view showing the structure of a downlink/uplink slot according to 3GPP LTE-A.

FIG. 9 is a view showing the structure of a downlink/uplink slot according to 3GPP LTE-A.

A radio frame used in 3GPP LTE/LTE-A has a length of 10 ms (327200 Ts) and includes 10 subframes of a uniform size. Each of the subframes has a length of 1 ms and includes two slots. 20 slots of a radio frame are sequentially numbered from 0 to 19. Each slot has a length of 0.5 ms. Here, Ts indicates sampling time, and Ts is expressed as Ts=1/(2048×15 kHz). Each slot includes a plurality of OFDMA symbols in a time domain and a plurality of resource blocks in a frequency domain. Each resource block includes a plurality of subcarriers in the frequency domain. The OFDMA symbols may be referred to as OFDMA symbols or SC-FDMA symbols according to multiple access methods. The number of OFDMA symbols included in a slot may be variously changed according to the bandwidth of a channel and the length of a CP. For example, in the case of a normal CP, a slot includes 7 OFDMA symbols. On the other hand, in the case of an extended CP, a slot includes 6 OFDMA symbols. FIG. 9 illustrates a subframe in which a slot includes 7 OFDMA symbols for the convenience of description. However, the ACK/NACK transmission methods of the present invention may be applied to different types of subframes in the same manner. For reference, in 3GPP LTE/LTE-A, a resource including an OFDMA symbol and a subcarrier is also referred to as a resource element (RE).

Referring to FIG. 9, a signal transmitted in each slot may be expressed as a resource grid including $N^{DL/UL}_{RB}N^{RB}_{SC}$ subcarriers and $N^{DL/UL}_{symb}$ OFDMA or SC-FDMA symbols. Here, $N^{DL}_{RB}$ indicates the number of resource blocks (RBs) on a downlink, and $N^{UL}_{RB}$ indicates the number of RBs on an uplink. $N^{DL}_{symb}$ indicates the number of OFDMA or SC-FDMA symbols in a downlink slot, and $N^{UL}_{symb}$ indicates the number of OFDMA or SC-FDMA symbols in an uplink slot. $N^{RD}_{SC}$ indicates the number of subcarriers constituting an RB.

In other words, a physical resource block (PRB) is defined as $N^{DL/UL}_{symb}$ successive OFDMA or SC-FDMA symbols in a time domain and as $N^{RB}_{SC}$ successive subcarriers in a frequency domain. Consequently, a PRB includes $N^{DL/UL}_{symb} \times N^{RB}_{SC}$ resource elements.

Each resource element in a resource grid may be uniquely defined by an index pair (k, 1) in a slot. K is an index given from 0 to $N^{DL/UL}_{RB} N^{RB}_{SC}-1$ in a frequency domain, and 1 is an index given from 0 to $N^{DL/UL}_{symb}-1$ in a time domain.

A relationship between physical resource block number $n_{PRB}$ in the frequency domain and the resource elements (k, 1) in the slot is given as follows.

$$n_{PRB} = \left\lfloor \frac{k}{N^{RB}_{SC}} \right\rfloor \quad \text{Equation 5}$$

ACK/NACK Transmission to a Downlink Signal

Figure 10:
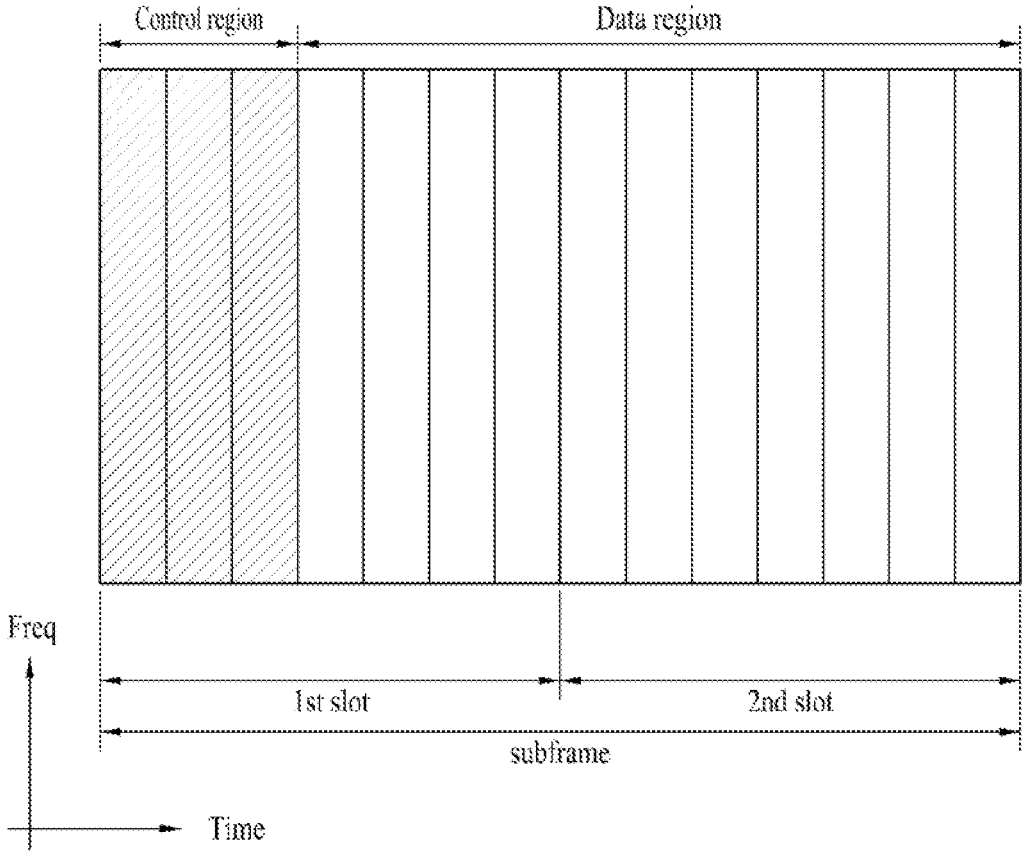
FIG. 10 is a view showing the structure of a downlink subframe according to 3GPP LTE-A.

FIG. 10 is a view showing the structure of a downlink subframe according to 3GPP LTE-A.

Referring to FIG. 10, in 3GPP LTE/LTE-A, each subframe includes a control region and a data region. The control region includes one or more OFDMA symbols starting from a first OFDMA symbol. The number of OFDMA symbols used as the control region of the subframe may be independently set for each subframe. The number of OFDMA symbols is transmitted through a Physical Control Format Indicator CHannel (PCFICH). A Physical Downlink Control CHannel (PDCCH), PCFICH, Physical Hybrid automatic retransmit request Indicator CHannel (PHICH), etc. may be allocated to the control region.

A Physical Downlink Shared Channel (PDSCH) may be allocated to the control region. A user equipment may decode control information transmitted through the PDCCH to read data transmitted through the PDSCH. For example, information indicating to which user equipment or which user equipment group PDSCH data are transmitted and how the user equipment or the user equipment group must receive and decode the PDSCH data is transmitted in a state in which the information is included in the PDCCH.

The control region of a subframe is a set of channel control elements (CCEs). A CCE corresponds to a plurality of Resource Element Groups (REGs). For example, a CCE may correspond to 9 REGs. An REG includes, for example, 4 resource elements. A control channel is mapped to a wireless resource per REG. Resource elements occupied by a reference signal are not included in an REG. Consequently, the total number of REGs in a predetermined OFDMA symbol is changed depending upon whether a reference signal is present in the predetermined OFDMA symbol. On the assumption that a CCE corresponds to 9 REGs, and the number of REGs of the control region which are not allocated to a PCFICH or a PHICH is $N_{REG}$, the total number $N_{CCE,K}$ of CCEs in a control region of a subframe K may be expressed as follows. CCEs which can be used in the system are numbered from 0 to $N_{CCE,K}-1$.

$$N_{CCE,k} = \lfloor N_{REG}/9 \rfloor \quad \text{Equation 6}$$

A PDCCH is transmitted on an channel control element (CCE) or an aggregation including several successive channel control elements (CCEs). The number of CCEs used to transmit a specific PDCCH is decided by a base station according to channel status. Format of the PDCCH and possible bit number of the PDCCH are decided based on the number of CCEs constituting the CCE aggregation. One or more PDCCHs may be transmitted in a subframe.

In 3GPP LTE/LTE-A, the position of a resource allocated to a user equipment for a downlink control channel automatically decides the position of an uplink ACK/NACK transmission channel, such as a PUCCH. For example, the position of a PDCCH to a specific user equipment automatically decices the position of a PUCCH through which the specific user equipment transmits ACK/NACK.

A physical uplink control channel (PUCCH) carries uplink control information (UCI). UCI transmitted on the PUCCH includes ACK/NACK used for HARQ, a channel quality indicator (CQI) indicating downlink channel status, a rank indicator (RI) for MIMO, and a scheduling request (SR), which is an uplink resource allocation request. The PUCCH supports various formats. Table 1 shows examples of formats supported by the PUCCH. Format 2a and format 2b are supported only at a normal cyclic prefix (CP).

TABLE 1

| PUCCH Format | Uplink Control Information |
|---|---|
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

All PUCCH formats use a cyclic shift of a sequence at each symbol. In this case, $n^{cell}_{cs}(n_s, 1)$ is used to derive the cyclic shift with respect to different PUCCH formats. A value of $n^{cell}_{cs}(n_s, 1)$ is changed according to symbol number 1 and slot number $n_s$ as follows.

$$n_{cs}^{cell}(n_s,l)=\Sigma_{i=0}^{7} c(8N_{symb}^{UL}\cdot n_s+8l+i)\cdot 2^i \quad \text{Equation 7}$$

A pseudo-random sequence c(i) is defined by a length-31 Gold sequence. An output sequence having a length of $M_{PN}$ is defined as follows.

$$c(n)=(x_1(n+N_c)+x_2(n+N_c))\bmod 2$$

$$(n+31)=(x_1(n+3)+x_1(n))\bmod 2$$

$$x_2(n+31)=(x_2(n+3)+x_2(n+2)+x_2(n+1)+x_2(n))\bmod 2 \quad \text{Equation 8}$$

Where n=0, 1, . . . , and $M_{PN}-1$, $N_c=1600$, and a first m-sequence is initialized to $x_1(0)=1$, $x_1(n)=0$, n=1, 2, . . . , and 30. Initialization of a second m-sequence is expressed by $c_{init}$ having a value depending on an application of the above sequence. $c_{init}$ is expressed as follows.

$$c_{init}=\Sigma_{i=0}^{30} x_2(i)\cdot 2^i \quad \text{Equation 9}$$

A pseudo-random sequence generator is initialized to $c_{init}=N^{cell}_{ID}$ at the start of each radio frame.

Physical resources used for a PUCCH depend on $N^{(2)}_{RB}$ and $N^{(1)}_{cs}$ given at upper layers. A variable $N^{(2)}_{RB}$, which is 0 or more, expresses a bandwidth that can be used in transmission of PUCCH format 2/2a/2b at each slot as a resource block. A variable $N^{(1)}_{cs}$ indicates the number of cyclic shifts used for PUCCH format 1/1a/1b at a resource block having a mixture of format 1/1a/1b and format 2/2a/2b. The variable $N^{(1)}_{cs}$ corresponds to a positive number times of $\Delta^{PUCCH}_{shift}$, which is a value provided by upper layers within a range of {0, 1, . . . , 7}. If $N^{(1)}_{cs}=0$, no mixed resource block is present. At each slot, at most one resource block supports a mixture of format 1/1a/1b and format 2/2a/2b. The above variables $N^{(2)}_{RB}$ and $N^{(1)}_{cs}$ may be indicated to a user equipment by broadcast signaling. Resources used in transmission of PUCCH format 1/1a/1b and PUCCH format 2/2a/2b may be expressed by an index having a positive integer as follows.

$$n^{(1)}_{PUCCH} \qquad \text{Equation 10}$$

$$n^{(2)}_{PUCCH} < N^{(2)}_{RB} N^{RB}_{sc} + \left\lceil \frac{N^{(1)}_{cs}}{8} \right\rceil \cdot (N^{RB}_{sc} - N^{(1)}_{cs} - 2)$$

A user equipment receives a PDCCH and transmits a PUCCH carrying a HARQ-ACK signal with respect to a PDSCH of a position indicated by the PDCCH at a control region of an uplink subframe. The PUCCH uses an RB at two slots of a subframe. A physical resource block used in transmission of the PUCCH at a slot $n_s$ is given as follows.

$$n_{PRB} = \begin{cases} \left\lfloor \frac{m}{2} \right\rfloor & \text{if } (m + n_s \bmod 2) \bmod 2 = 0 \\ N^{UL}_{RB} - 1 - \left\lfloor \frac{m}{2} \right\rfloor & \text{if } (m + n_s \bmod 2) \bmod 2 = 1 \end{cases} \qquad \text{Equation 11}$$

$n_{PRB}$ is physical resource block number, $n_s$ is a slot number in a radio frame, and a variable m is a value changed according to PUCCH formats.

The variable m may be decided with respect to PUCCH formats 1, 1a, and 1b as follows.

$$m = \begin{cases} N^{(2)}_{RB} & \text{if } n^{(1)}_{PUCCH} < c \cdot N^{(1)}_{cs} / \Delta^{PUCCH}_{shift} \\ \left\lfloor \frac{n^{(1)}_{PUCCH} - c \cdot N^{(1)}_{cs} / \Delta^{PUCCH}_{shift}}{c \cdot N^{RB}_{sc} / \Delta^{PUCCH}_{shift}} \right\rfloor + N^{(2)}_{RB} + \left\lfloor \frac{N^{(1)}_{cs}}{8} \right\rfloor & \text{otherwise} \end{cases} \qquad \text{Equation 12}$$

$$c = \begin{cases} 3 & \text{normal cyclic prefix} \\ 2 & \text{extended cyclic prefix} \end{cases}$$

The variable m may be decided with respect to PUCCH formats 2, 2a, and 2b as follows.

$$m = \lfloor n_{PUCCH}^{(2)} / N_{SC}^{RB} \rfloor \qquad \text{Equation 13}$$

Figure 11:
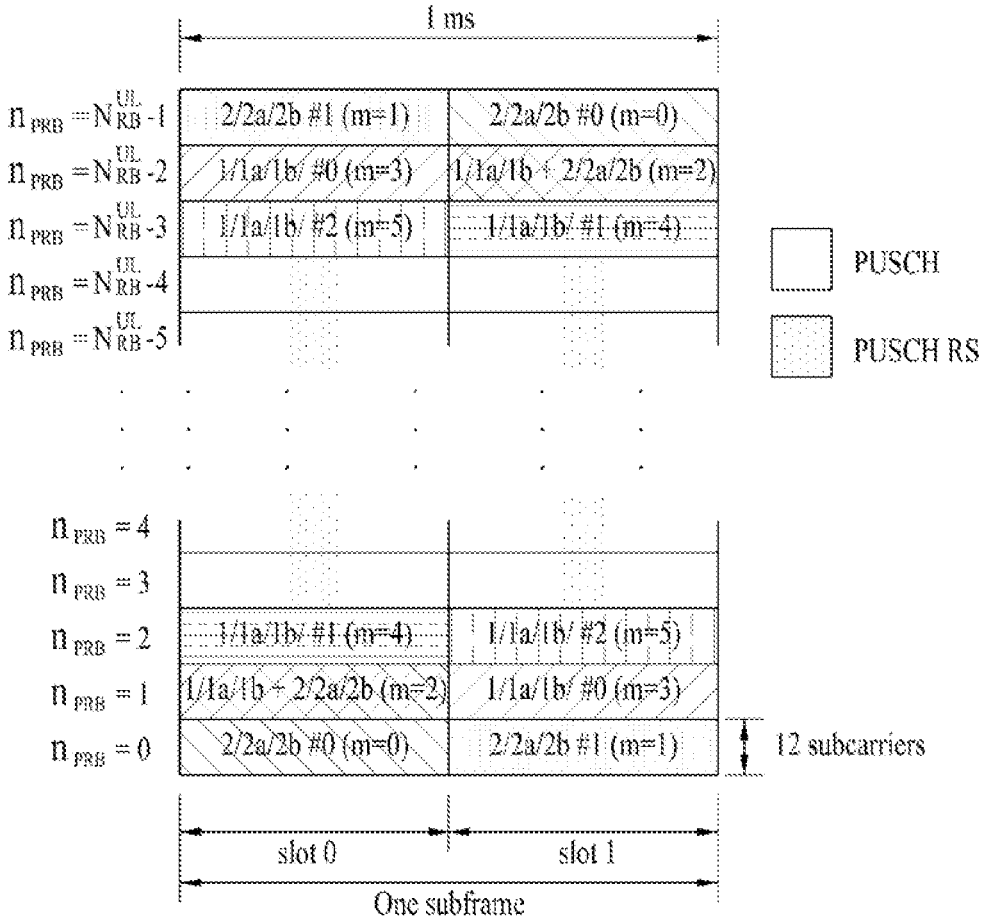
FIG. 11 is a view showing a mapping example of a PUCCH format to a PUCCH RB or a PUCCH region.

FIG. 11 is a view showing a mapping example of a PUCCH format to a PUCCH RB or a PUCCH region. FIG. 10 illustrates that a PUCCH having m=0, 1, 2, 3, 4, and 5 is allocated to a subframe.

Referring to FIG. 11, an uplink subframe may be divided into a region to which a PUCCH carrying control information is allocated and a region to which a PUSCH carrying user data is allocated. In a frequency domain aspect, a PUSCH is allocated to a middle band of the uplink subframe, and a PUCCH is allocated to each end of the uplink subframe.

In a case in which a sounding reference signal and PUCCH format 1, 1a, or 1b are simultaneously transmitted, a symbol located on the PUCCH is punctured.

In deciding a PUCCH resource $n^{(1)}_{PUCCH}$, for example, a frequency division duplex FDD may be decided as follows.

$$n_{PUCCH}^{(1)} = n_{CCE} + N_{PUCCH}^{(1)} \qquad \text{Equation 14}$$

Where, $n_{CCE}$ is a number corresponding to the position of the first Control Channel Element (CCE) allocated in a PDCCH for a user equipment. Control information transmitted through the PDCCH may also be referred to as Downlink Control Information (DCI). $n_{CCE}$ is the number or index of the first CCE used to transmit corresponding DCI.

Where, $N^{(1)}_{PUCCH}$, which is a system parameter decided by an upper layer, designates an offset. $N^{(1)}_{PUCCH}$ is a system parameter having the same value with respect to all user equipments in a cell. If different nodes allocate PUCCH resources according to Equation 14 while transmitting DCI for different user equipments to the same CCEs in the PDCCH, therefore, a plurality of user equipments occupies the same uplink resource. As a result, interference in uplink transmission of the PUCCHs of the user equipments may be caused.

In order to solve this problem, the present invention reflects a value decided by reflecting one or more of the above paragraphs (1) to (7) to allocate or map a resource to a PUCCH. The user equipment processor 400a according to the present invention is configured to generate ACK/NACK information for a signal transmitted from a base station and to allocate a PUCCH carrying the ACK/NACK information to a time and/or frequency resource based on a value decided by reflecting one or more of the above paragraphs (1) to (7). Under control of the user equipment processor 400a, the resource element mapper 305 of the user equipment maps the PUCCH carrying the ACK/NACK information to a resource decided in consideration of one or more of the above paragraphs (1) to (7).

For example, the user equipment processor 400a may decide a PUCCH resource $n^{(1)}_{PUCCH}$ according to the following expression.

$$n_{PUCCH}^{(1)} = n_{CCE} + N_{PUCCH}^{(1)} + n_{offset}^{UL} \qquad \text{Equation 15}$$

Where, $n^{UL}_{offset}$, which is a value defined for each user equipment, may be a function including at least one of the above paragraphs (1) to (7) as a variable. The $n^{UL}_{offset}$ may be provided to a user equipment by an upper layer. The $n^{UL}_{offset}$ value may be included in DCI transmitted to each user equipment and may be transmitted to the corresponding user equipment. The DCI including the $n^{UL}_{offset}$ value may be transmitted to a user equipment through a downlink channel, such as a PDCCH or a PDSCH. The base station may differently set the $n^{UL}_{offset}$ for each user equipment or each user equipment group to avoid interference in PUCCH transmission. The base station processor 400b may differently set $n^{UL}_{offset}$ for each user equipment or each user equipment group in consideration of at least one of the above paragraphs (1) to (7), and may control the base station transmitter 100b to transmit the $n^{UL}_{offset}$ to the corresponding user equipment or the corresponding respective user equipment groups.

For example, $n^{UL}_{offset}$ may be a function of an identifier of a node having transmitted a PDCCH or the kind or group of a node having transmitted the PDCCH. That is, a transmission resource of a PUCCH may be changed depending upon a node having transmitted a PDCCH.

As another example, $n^{UL}_{offset}$ may be decided in consideration of a node to which a PUCCH is to be transmitted as well as the node having transmitted a PUCCH. For example, $n^{UL}_{offset}$ may be defined as a function of the difference between an identifier (or kind, group ID) of a node having transmitted a PDCCH and an identifier (or kind, group ID) of a node to which a PUCCH is to be transmitted. The user equipment processor 400a or the base station processor 400b may decide a PUCCH resource using $n^{UL}_{offset}$ obtained from the difference between an identifier (or kind, group ID) of a node having transmitted a PDCCH and an identifier (or kind, group ID) of a node to which a PUCCH is to be transmitted. For example, in the case of a user equipment having a downlink and an uplink connected to the same node, $n^{UL}_{offset}$ may be set to 0, and therefore, a PUCCH may be transmitted on the same resource as that allocated according to Equation 14. On the other hand, in the case of a user equipment having a downlink and an uplink connected to different nodes, $n^{UL}_{offset}$ may not be set to 0, and therefore, a PUCCH may be transmitted on a resource different from that allocated according to Equation 14.

At this time, usable PUCCH resources may be divided based on the difference between an identifier of a downlink transmission node and an identifier of an uplink transmission node so that the PUCCH resources can be used for ACK/NACK transmission. For example, on the assumption that the number of PUCCH resources that can be used for ACK/NACK transmission is 3K, the PUCCH resources may be divided into three equal regions so that ACK/NACK information is transmitted to user equipments having a downlink and an uplink connected to the same node at the first region ($n^{UL}_{offset}=0$), ACK/NACK information is transmitted to user equipments having odd difference between an identifier of a downlink transmission node and an identifier of an uplink transmission node at the second region ($n^{UL}_{offset}=K$), and ACK/NACK information is transmitted to user equipments having the difference between an identifier of a downlink transmission node and an identifier of an uplink transmission node at the last region ($n^{UL}_{offset}=2K$).

Meanwhile, $n^{UL}_{offset}$ may not be separately transmitted to a user equipment through an upper layer but may be calculated by the user equipment. For example, $n^{UL}_{offset}$ may be defined as a function of at least one from among an antenna index, an antenna node index, and a reference signal pattern index, and the user equipment processor 400a may recognize the antenna index, the antenna node index, and the reference signal pattern index to decide $n^{UL}_{offset}$.

In a DAS, antennas or antenna nodes to transmit a PDCCH to the respective user equipments may be different from each other. Each user equipment may recognize an antenna or an antenna node allocated thereto using various methods. For example, the base station may signal information designating the antenna or an antenna node allocated to the user equipment (hereinafter, referred to as antenna node information) to the user equipment using various methods. For example, the base station may clearly signal the antenna node information of the user equipment through an upper layer or may indirectly signal the antenna node information of the user equipment by masking control information of the user equipment using a corresponding antenna or antenna node index and/or scrambling the control information of the user equipment using the corresponding antenna or antenna node index. Although the base station does not clearly/implicitly signal the antenna node information, the user equipment may measure the intensity of a downlink reference signal to recognize the antenna or antenna node allocated thereto.

Also, it may be defined that the user equipment recognizes a multiplexing sequence of a PDCCH assigned thereto to decide $n^{UL}_{offset}$. For example, on the assumption that DCI of two user equipments is multiplexed to the same resource of a PDCCH, each user equipment processor 400a may confirm the multiplexing order of the information thereof time while receiving DCI thereof and may allocate a PUCCH resource based thereupon. For example, the first multiplexed user equipment may set $n^{UL}_{offset}$ to 0 to allocate a PUCCH resource. On the other hand, the later multiplexed user equipment may set $n^{UL}_{offset}$ to 1 to allocate a PUCCH resource. A multiplexing sequence of user equipments may be confirmed based on a codeword or MIMO stream allocated to each user equipment, a transmission block index, or a sequence.

Meanwhile, separately from Equation 14 and Equation 15, it is possible to allocate an independent PUCCH resource for user equipments having a downlink connection node and an uplink transmission node which are different from each other. In this case, the base station may inform the user equipment of information regarding which resource the user equipment must use to transmit a PUCCH in the form of an upper layer message or a downlink control message through a PDCCH. The base station processor 400b may generate the control message and may control the base station transmitter 100b to transmit the control message to the corresponding user equipment through the upper layer message or the PDCCH. In a case in which the downlink connection node and the uplink connection node are different from each other, the user equipment may be prescribed to use a newly set PUCCH resource. That is, a user equipment having a downlink connection node and an uplink connection node which are different from each other may be configured to transmit an ACK/NACK signal at a portion of the conventional PUCCH region or a new PUCCH region. According to this, a user equipment having a downlink connection node and an uplink connection node which are the same transmits ACK/NACK information at the conventional PUCCH region, and a user equipment having a downlink connection node and an uplink connection node which are different from each other uses a newly set PUCCH resource. Consequently, it is possible to prevent collision of PUCCH resources between a user equipment performing uplink and downlink transmission at the same node and a user equipment performing uplink and downlink transmission at different nodes.

In connection with the conventional user equipments (hereinafter, referred to as legacy user equipments), it may be defined that only new user equipments supporting multi-node communication consider $n^{UL}_{offset}$ to decide a PUCCH resource $n^{(1)}_{PUCCH}$. In this case, the legacy user equipments decide a PUCCH resource $n^{(1)}_{PUCCH}$ according to Equation 14, and the processors 400a of the new user equipments decide $n^{(1)}_{PUCCH}$ according to Equation 15. As a result, $n^{(1)}_{PUCCH}$ of the legacy user equipments and $n^{(1)}_{PUCCH}$ of the new user equipments may collide with each other. In order to avoid collision of the PUCCH resources between the legacy user equipments and the new user equipments, therefore, CCEs assigned to the legacy user equipments and/or the new user equipments receiving control channels using all antennas of the base station may be different from CCEs assigned to the new user equipments having different control channels transmitted for each antenna node. For example, the processors 400a of the new user equipments may be configured so that the control channels of the new user equipments are assigned to CCEs following the control channels of the legacy user equipments. Alternatively, control channels of the legacy user equipments and control channels of the new user equipments may be separately configured.

ACK/NACK Transmission to an Uplink Signal

In LTE-A, an uplink HARQ or ACK/NACK signal to uplink data transmission through a PUSCH is transmitted through a PHICH. A PHICH is a physical HARQ indicator channel, which is used to carry a HARQ ACK/NACK signal to uplink transmission. That is, a PHICH indicates an ACK/NACK channel, through which downlink ACK/NACK information for uplink HARQ is transmitted. A PHICH includes an REG, and is cell-specifically scrambled. An ACK/NACK signal is indicated as one bit, and is modulated by Binary Phase Shift Keying (BPSK). The modulated ACK/NACK signal is multiplexed using a code division multiplexing (CDM) method and then transmitted. For example, an ACK/NACK signal is multiplexed at spreading factor (SF)=4 and In-phase/Quadrature-phase (I/Q) in a subframe using a normal CP. On the other hand, the ACK/NACK signal is multiplexed at SF=2 and I/1 in a subframe using an extended CP.

A plurality of PHICHs mapped to the same resource constitutes a PHICH group. The number of PHICHs multiplexed to a PHICH group is decided based on the number of spreading codes. The following table shows an example of codes used to spread an ACK/NACK signal.

TABLE 2

| Sequence index $n_{PHICH}^{seq}$ | Orthogonal sequence: Normal cyclic prefix $N_{SF}^{PHICH}=4$ | Orthogonal sequence: Extended cyclic prefix $N_{SF}^{PHICH}=2$ |
|---|---|---|
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

In the above table, $N^{PHICH}_{SF}$ indicates a spreading factor used in PHICH modulation, and $n^{group}_{PHICH}$ indicates a PHICH group number.

PHICH (group) is repeated three times to obtain a diversity gain in a frequency domain and/or a time domain. In the case of a normal CP, therefore, four resource elements (REs) are repeated three times, and eight PHICHs are transmitted as a PHICH group through a total of 12 REs. In the case of an extended CP, on the other hand, two REs are repeated three times, and four PHICHs are transmitted as a PHICH group through a total of 6 REs.

In PUSCH transmission through a subframe n, a user equipment must decide a corresponding PHICH resource in a subframe $n+k_{PHICH}$. $k_{PHICH}$ is always 4 with respect to a FDD, and may be decided based on the following table with respect to a time division duplex (TDD).

TABLE 3

| TDD UL/DL configuration | UL subframe index n: 0 | 1 | 2 | 3 | 4 | 5 | 6 | 7 | 8 | 9 |
|---|---|---|---|---|---|---|---|---|---|---|
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Figure 12:
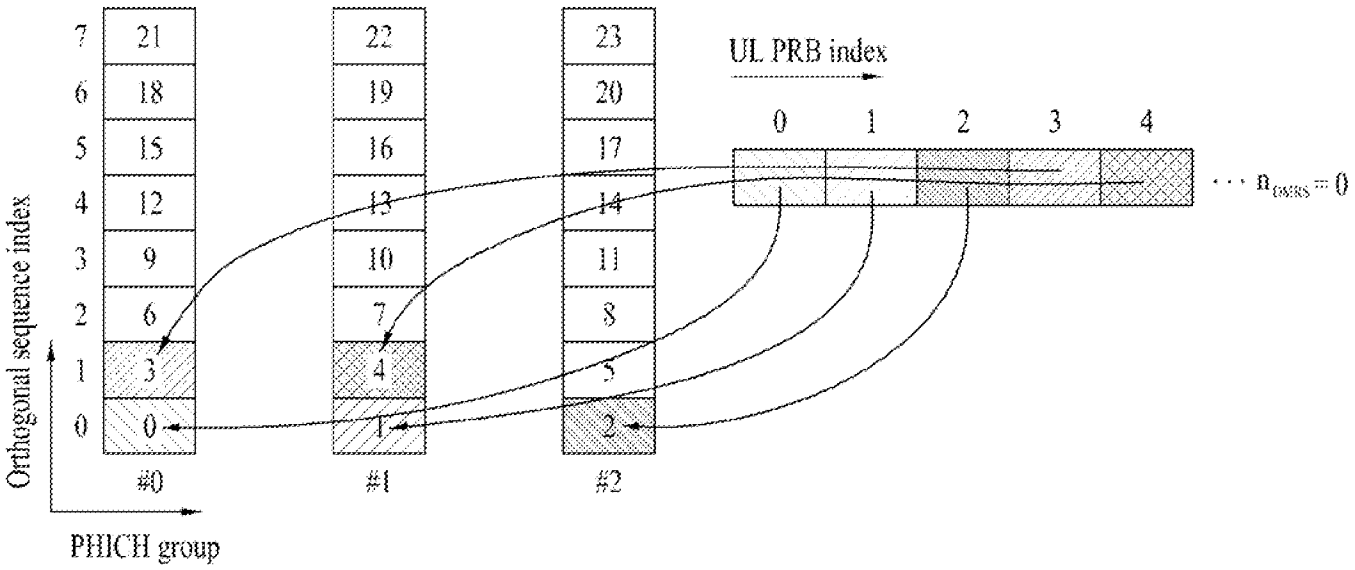
FIG. 12 is a view showing an example of a mapping relationship between a minimum PRB index in a PUSCH and a PHICH resource.

FIG. 12 is a view showing an example of a mapping relationship between a minimum PRB index in a PUSCH and a PHICH resource.

A PHICH resource is decided by an index pair $(n^{group}_{PHICH}, n^{seq}_{PHICH})$. $n^{group}_{PHICH}$ indicates a PHICH group number, and $n^{seq}_{PHICH}$ indicates an orthogonal sequence index in the group. The $n^{group}_{PHICH}$ and $n^{seq}_{PHICH}$ may be decided according to, for example, the following Equations.

$$n_{PHICH}^{group}=(I_{PRB_RA}^{lowest_index}+n_{DMRS})\bmod N_{PHICH}^{group}+I_{PHICH}N_{PHICH}^{group}$$

$$n_{PHICH}^{seq}=(\lfloor I_{PRB_RA}^{lowest_index}/N_{PHICH}^{group}\rfloor+n_{DMRS})\bmod 2N_{SF}^{group} \quad \text{Equation 16}$$

Where, $n_{DMRS}$ is a value indicating a cyclic shift applied to a DMRS for the corresponding PUSCH. The $n_{DMRS}$ may be obtained from a value set to a cyclic shift field to a DMRS, included in the latest DCI format 0 for a transmission block associated with transmission of the corresponding PUSCH. DCI format 0 is a DCI format used for scheduling of a PUSCH. $n_{DMRS}$ may be mapped according to, for example, the following table based on the value set to the field in DCI format 0.

TABLE 4

| Cyclic Shift for DMRS Field in DCI format 0 | $n_{DMRS}$ |
|---|---|
| 000 | 0 |
| 001 | 1 |
| 010 | 2 |
| 111 | 3 |
| 100 | 4 |
| 101 | 5 |
| 110 | 6 |
| 111 | 7 |

$I^{lowest_index}_{PRB_RA}$ indicates a minimum PRB index in a first slot transmitting a corresponding PUSCH. $I_{PHICH}$, which is a value set to 1 or 0, is set to 1 for a time division duplex (TDD) uplink/downlink configuration 0 transmitting a PUSCH at a subframe n=4 or 9 and to 0 for the other configurations. $N^{group}_{PHICH}$ indicates the number of PHICH groups configured by an upper layer. The number of PHICH groups ($N^{group}_{PHICH}$) may be decided as follows.

$$N_{PHICH}^{group}=\begin{cases}\lceil N_g(N_{RB}^{DL})/8\rceil & \text{for normal CP}\\ 2\cdot\lceil N_g(N_{RB}^{DL})/8\rceil & \text{for extended CP}\end{cases} \quad \text{Equation 17}$$

Where, $N_g$ is a value selected from four values, {⅙, ½, 1, 2}, and signaled from a base station. For example, in a case in which a system band has 25 RBs and uses a normal CP, $N^{group}_{PHICH}$ becomes {1, 2, 4, 7} with respect to $N_g$, {⅙, ½, 1, 2}.

As can be seen from Equation 16, the position of a PHICH in a subframe $n+k_{PHICH}$ is decided by the position of a PUSCH in a subframe n. If a plurality of user equipments transmits uplink data to multiple nodes through the same PUSCH resource, and the same node transmits downlink ACK/NACK information to the plurality of user equipments, therefore, the user equipments are allocated to the same PHICH resource with the result that interference between PHICHs of the user equipments occurs. For example, referring to FIGS. 8 and 12, it is assumed that UE1 transmits a PUSCH having a minimum PRB index in a first slot of 0 to Node 1, UE2 transmits a PUSCH having a minimum PRB index in a first slot of 0 to Node 2, and both ACK/NACK to UE1 and ACK/NACK to UE2 are transmitted through Node 2. In this case, both ACK/NACK to UE1 and ACK/NACK to UE2 are allocated to PHICH resource 0 with the result that interference between downlink ACK/NACK signals transmitted by Node 1 occurs. Since transmission power of the base station is greater than that of each user equipment, interference between downlink ACK/NACK signals may be more serious than interference between uplink ACK/NACK signals. In order to solve this problem, the present invention reflects a value decided by reflecting one or more of the above paragraphs (1) to (7) to allocate or map a PHICH resource. The base station processor 400b according to the present invention may generate ACK/NACK information for uplink transmission of a user equipment and may allocate a PHICH resource, through which a PHICH carrying the ACK/NACK information will be transmitted, based on a value decided by reflecting one or more of the above paragraphs (1) to (7). Under control of the base station processor 400b, the resource element mapper 305 of the base station may map the PHICH carrying the ACK/NACK information to a PHICH resource decided based on a value decided in consideration of one or more of the above paragraphs (1) to (7). Under control of the base station processor 400b, the base station transmitter 100b may transmit the ACK/NACK information on a PHICH resource decided based on a value decided in consideration of one or more of the above paragraphs (1) to (7).

For example, a PHICH group number $n^{group}_{PHICH}$ may be decided according to the following expression.

$$n_{PHICH}^{group}=(I_{PRB_RA}^{lowest_index}+n_{DMRS}+n_{offset}^{DL})\bmod N_{PHICH}^{group}+I_{PHICH}N_{PHICH}^{group} \quad \text{Equation 18}$$

Alternatively, a PHICH orthogonal sequence index $n^{seq}_{PHICH}$ may be decided according to the following expression.

$$n_{PHICH}^{seq}=(\lfloor I_{PRB_RA}^{lowest_index}/N_{PHICH}^{group}\rfloor+n_{DMRS}+n_{offset}^{DL})\bmod 2N_{SF}^{group} \quad \text{Equation 19}$$

Otherwise, a PHICH group number $n^{group}_{PHICH}$ and a PHICH orthogonal sequence index $n^{seq}_{PHICH}$ may be decided according to Equation 18 and Equation 19, respectively.

The base station processor 400b may decide $n^{group}_{PHICH}$ and/or $n^{seq}_{PHICH}$ according to Equation 18 and/or Equation 19 or may apply $n^{seq}_{PHICH}$ decided by Equation 16 or Equation 19 to spread a corresponding PHICH. Also, the base station processor 400b may control the resource element mapper 305 of the base station to allocate the PHICH to time and frequency resources of $n^{group}_{PHICH}$ decided by Equation 16 or Equation 18.

In the same manner as $n^{UL}_{offset}$ of Equation 15, the $n^{UL}_{offset}$, which is a value defined for each user equipment, may be a function including at least one of the above paragraphs (1) to (7) as a variable. The $n^{DL}_{offset}$ may be provided to a user equipment by an upper layer.

For example, $n^{DL}_{offset}$ may be a function of an identifier or kind of a node having transmitted a PUSCH or a function of an identifier or kind of a node receiving a PHICH. That is, a transmission resource of a PHICH may be changed depending upon a node having transmitted a PUSCH or a node which will transmit the PHICH.

It is also possible to allocate a PHICH transmission resource in consideration of both a node having transmitted a PUSCH and a node which will transmit the PHICH. For example, $n^{DL}_{offset}$ may be defined as a function of the difference between an identifier (kind or group identifier) of a node having transmitted a PUSCH and an identifier (kind or group identifier) of a node which will transmit a PHICH.

As another example, $n^{DL}_{offset}$ may be defined as a function of a reception antenna, an antenna node, or pilot pattern information in consideration of the fact that it is possible to receive uplink signals of different user equipments for antennas or antenna nodes of the base station.

As yet another example, it may be defined that $n^{DL}_{offset}$ is defined using a multiplexing sequence during uplink transmission. The multiplexing sequence may be designated by a base station, and a user equipment may be informed of the multiplexing sequence. Alternatively, the multiplexing sequence may be decided according to an agreed rule.

[IEEE 802.16]

A radio frame structure used in IEEE 802.16 may include a 20 ms superframe supporting a bandwidth of 5 MHz, 8.75 MHz, 10 MHz, or 20 MHz. The superframe may include four 5 ms frames F0 to F3 of the same size, and begins with a SuperFrame Header (SFH). The SuperFrame Header carries an essential system parameter and system configuration information. The SuperFrame Header may be located at a first subframe in the superframe. A frame may include 8 subframes SF0 to SF7. Subframes are allocated to downlink or uplink transmission. Each subframe includes a plurality of OFDMA symbols in a time domain and a plurality of resource units (RUs) in a frequency domain. Each RU includes a plurality of subcarriers in the frequency domain. The OFDMA symbols may be referred to as OFDMA symbols or SC-FDMA symbols according to multiple access methods. The number of OFDMA symbols included in each subframe may be variously changed according to the bandwidth of a channel and the length of a Cyclic Prefix (CP). The type of a subframe may be defined based on the number of OFDMA symbols included in the subframe. For example, type-1 subframe may be defined as including 6 OFDMA symbols, type-2 subframe may be defined as including 7 OFDMA symbols, type-3 subframe may be defined as including 5 OFDMA symbols, and type-4 subframe may be defined as including 9 OFDMA symbols. A subframe may include the same type of subframes or different types of subframes. FIG. 6 illustrates type-1 subframe in which a subframe includes 6 OFDMA symbols for the convenience of description. However, embodiments of the present invention, which will hereinafter be described, may also be applied to different types of subframes in the same manner. For reference, in IEEE 802.16, a resource including an OFDMA symbol and a subcarrier is also referred to as a tone.

In IEEE 802.16, an Assignment A-MAP IE, a HARQ subpacket, and a corresponding feedback are transmitted according to predefined timing. On an uplink, retransmission of the HARQ subpacket is also based on the predefined timing. Each transmission time is indicated by a frame index and a subframe index. To decide A-MAP relevance and HARQ timing, a downlink HARQ feedback offset z, an uplink HARQ transmission offset v, and an uplink HARQ feedback offset w are set. In downlink HARQ transmission, uplink reception processing time $T_{DL_Rx_Processing}$ of a user equipment is considered for the downlink HARQ feedback offset z. In uplink HARQ transmission, uplink transmission processing time $T_{UL_Tx_Processing}$ of a user equipment and uplink reception processing time $T_{UL_Rx_Processing}$ of a base station are considered for the uplink HARQ transmission offset v and the uplink HARQ feedback offset w, respectively. In a case in which the number of subframes constituting a frame is 8, $T_{DL_Rx_Processing}$ and $T_{UL_Tx_Processing}$ of the user equipment correspond to 3 subframes. $T_{UL_Rx_Processing}$ of the base station correspond to 3 or 4 subframes, which are broadcast via a SFH.

ACK/NACK Transmission to a Downlink Signal

Figure 13:
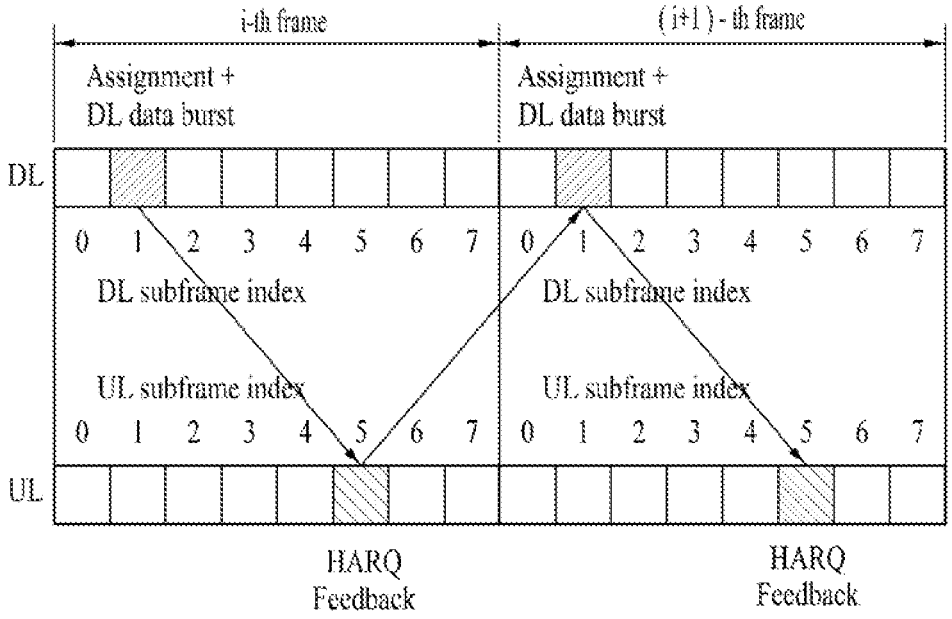
FIGS. 13 and 14 are views showing examples of uplink ACK/NACK transmission according to IEEE 802.16.
Figure 14:
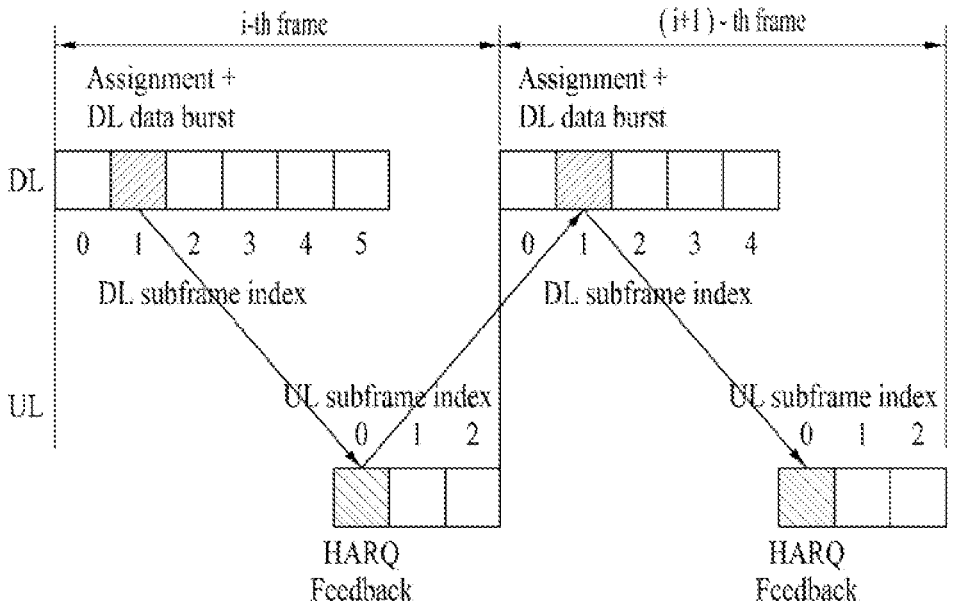

FIGS. 13 and 14 are views showing examples of uplink ACK/NACK transmission according to IEEE 802.16.

FIG. 13 shows a timing relationship among a DL assignment A-MAP IE, a DL HARQ subpacket having a default TTI, a corresponding HARQ feedback, and retransmission in an FDD frame structure. In this example, $T_{DL_Rx_Processing}$ corresponds to 3 subframes. Referring to FIG. 13, ACK/NACK information regarding downlink subframe 1 of an i-th frame is transmitted in uplink subframe 5.

FIG. 14 shows a timing relationship among a DL assignment A-MAP IE, a DL HARQ subpacket having a default TTI, a corresponding HARQ feedback, and retransmission in a TDD frame structure. In this example, $T_{DL_Rx_Processing}$ corresponds to 3 subframes. Referring to FIG. 14, ACK/NACK information regarding downlink subframe 1 of an i-th frame is transmitted in uplink subframe 0 of the i-th frame.

Meanwhile, in a case in which flexible/fractional frequency reuse (FFR) is applied to a subframe, logical resource units (LRUs) of the subframe are divided into one or more frequency partitions in a frequency domain. Distributed LRUs of each uplink frequency partition may be divided into a data region, a bandwidth request region, and a feedback region. The feedback region includes feedback channels that can be used in HARQ ACK/NACK and fast feedback.

Figure 15:
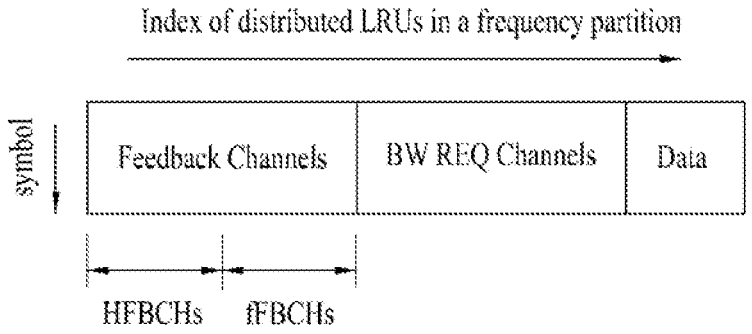
FIG. 15 is a view showing an example of an uplink control channel and a data channel allocated to distributed logical resource units of a frequency partition of a subframe.

FIG. 15 is a view showing an example of an uplink control channel and a data channel allocated to distributed logical resource units of a frequency partition of a subframe.

Referring to FIG. 15, each feedback channel may be used to transmit 6 HARQ feedback channels. The number of HARQ feedbacks per HARQ feedback region is denoted by $L_{HFB}$.

In an FDD, a HARQ feedback region is provided per uplink subframe.

On the assumption that, in a TDD, a set of downlink subframe indices having a relationship of $m_0<m_1<\ldots<m_{K-1}$ is $M=\{m_0, m_1, \ldots, m_{K-1}\}$, the number of HARQ feedback regions in an uplink subframe is equal to the number of the downlink subframes associated with HARQ feedback, i.e. K based on the size of the set M. On the assumption that an index of a first HARQ feedback region is 0, an index of a HARQ feedback region associated with downlink data burst starting at a subframe $m_k$ corresponds to the order of $m_k$ in the set M.

According to IEEE 802.16m, a HARQ FeedBack Channel (HFBCH), which is an ACK/NACK channel, through which ACK/NACK information is transmitted in each HARQ feedback region, may be decided by a DL basic assignment A-MAP information element (IE), a DL subband assignment A-MAP IE, and a DL persistent allocation A-MAP IE, for example, as follows.

$$k=(M(j)+n)\bmod L_{HFB} \qquad \text{Equation 20}$$

Where, k indicates an HFBCH index, and $L_{HFB}$ indicates a total number of HARQ feedback channels configured per HARQ feedback region. j indicates an HFBCH index parameter of a non-user specific A-MAP IE. The HFBCH index parameter indicates which transmission parameter is to be used to calculate the HFBCH index. In a case in which j in the non-user specific A-MAP IE is 0, a STation IDentifier (STID) is used as a value of the M(j). On the other hand, in a case in which j is 1, the lowest LRU index corresponding to downlink transmission is used as a value of the M(j). In the DL persistent allocation A-MAP IE, M(j) is always STID irrespective of a value of j. n indicates a 3-bit HARQ Feedback Allocation (HFA) value signaled via an assignment A-MAP IE.

In a case in which the HFBCH index is decided as described above, ACK/NACK information of a plurality of user equipments may be transmitted to a specific node through the same HFBCH resource. In the same manner as in the above description of [3GPP LTE-A], therefore, the present invention reflects a value decided by reflecting one or more of the above paragraphs (1) to (7) to allocate/map a HFBCH. The user equipment processor 400a according to the present invention may allocate the HFBCH to a wireless resource based on $n^{UL}_{offset}$ decided by reflecting one or more of the above paragraphs (1) to (7). Under control of the user equipment processor 400a, the resource element mapper 305 of the user equipment may map the HFBCH to a resource decided by reflecting $n^{UL}_{offset}$. Under control of the user equipment processor 400a, the transmitter 100a of the user equipment may transmit the HFBCH on the resource.

For example, the user equipment processor 400a may decide an HFBCH index k according to the following expression.

$$k=(M(j)+n+n_{offset}^{UL})\bmod L_{HFB} \qquad \text{Equation 21}$$

Where, $n^{UL}_{offset}$, which is a value defined for each user equipment in the same manner as in the above description of [3GPP LTE-A], may be a function including at least one of the above paragraphs (1) to (7) as a variable. Under control of the user equipment processor 400a, the resource element mapper 305 of the user equipment may map ACK/NACK information of downlink transmission to the user equipment to a resource corresponding to the HFBCH index k. Under control of the user equipment processor 400a, the transmitter 100a of the user equipment may transmit the ACK/NACK information on the resource to the base station.

$n^{UL}_{offset}$ may be a value provided from an upper layer to each user equipment. The $n^{UL}_{offset}$ value may be transmitted to each user equipment through a superframe header (SFH) and an Advanced MAP (A-MAP). The base station may differently set the $n^{UL}_{offset}$ value for each user equipment or each user equipment group and may transmit the differently set $n^{UL}_{offset}$ value through the SFH and/or the A-MAP to avoid interference between ACK/NACK transmission signals.

$n^{UL}_{offset}$ may not be transmitted from a base station to a user equipment through an upper layer. Instead, $n^{UL}_{offset}$ may be defined as a function having one or more selected from an antenna index, an antenna node index, and a reference signal pattern index as a variable, and the corresponding user equipment may recognize the antenna index, the antenna node index, and the reference signal pattern index to use the $n^{UL}_{offset}$ in deciding an HFBCH index. The methods of the user equipment recognizing the antenna index, the antenna node index, and the reference signal pattern index, described in [3GPP LTE-A], may also be applied to IEEE 802.16 in the same manner.

Meanwhile, it may be decided whether $n^{UL}_{offset}$ defined per user equipment according to an HFBCH index parameter is to be considered when deciding an HFBCH index. For example, in a case in which the HFBCH index parameter j in the non-user specific A-MAP IE is set to 0 or 1, the HFBCH index may be calculated according to Equation 20. On the other hand, in a case in which j is set to 2, the HFBCH index may be calculated in consideration of $n^{UL}_{offset}$ according to Equation 21. So that base station(s) of nodes participating in multi-node coordinated communication may set an HFBCH index parameter in a non-user specific A-MAP IE and may transmit the set HFBCH index parameter to a user equipment within coverage of the corresponding node through coordinated scheduling to avoid uplink ACK/NACK of user equipments from being transmitted to a specific node through the same HFBCH.

ACK/NACK Transmission to an Uplink Signal

Figure 16:
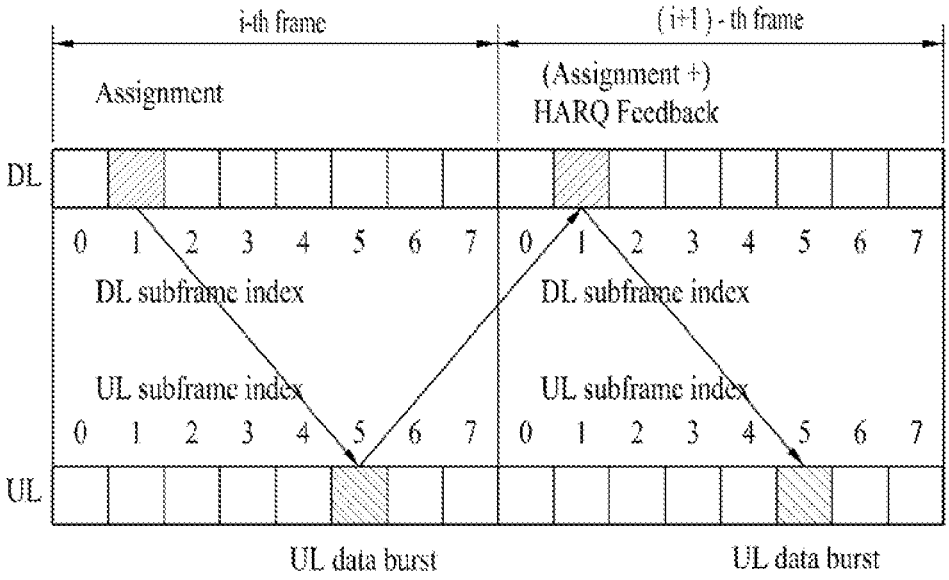
FIGS. 16 and 17 are views showing examples of downlink ACK/NACK transmission according to IEEE 802.16.
Figure 17:
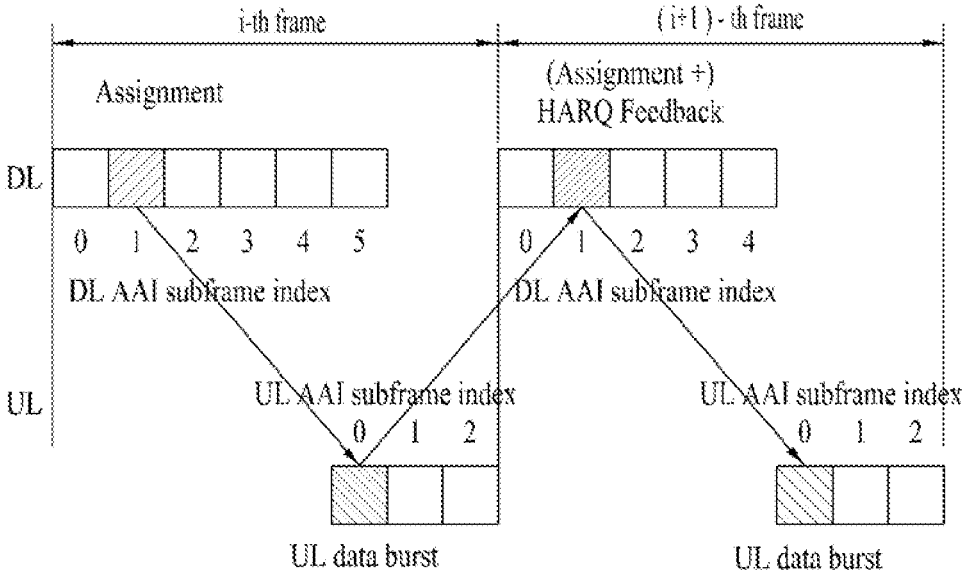

FIGS. 16 and 17 are views showing examples of downlink ACK/NACK transmission according to IEEE 802.16. Specifically, FIG. 16 shows an example of a timing relationship among a UL assignment A-MAP IE, a UL HARQ subpacket having a default TTI, a corresponding HARQ feedback, and retransmission in an FDD frame structure. In this example, $T_{UL_Tx_Processing}$ and $T_{UL_Rx_Processing}$ correspond to 3 subframes. Referring to FIG. 16, ACK/NACK information regarding uplink subframe 5 of an i-th frame is transmitted in downlink subframe 1 of an (i+1)-th frame.

FIG. 17 shows a timing relationship among a DL assignment A-MAP IE, a DL HARQ subpacket having a default TTI, a corresponding HARQ feedback, and retransmission in a TDD frame structure. In this example, $T_{DL_Rx_Processing}$ corresponds to 3 subframes. Referring to FIG. 17, ACK/NACK information regarding uplink subframe 0 of an i-th frame is transmitted in downlink subframe 1 of an (i+1)-th frame.

Figure 18:
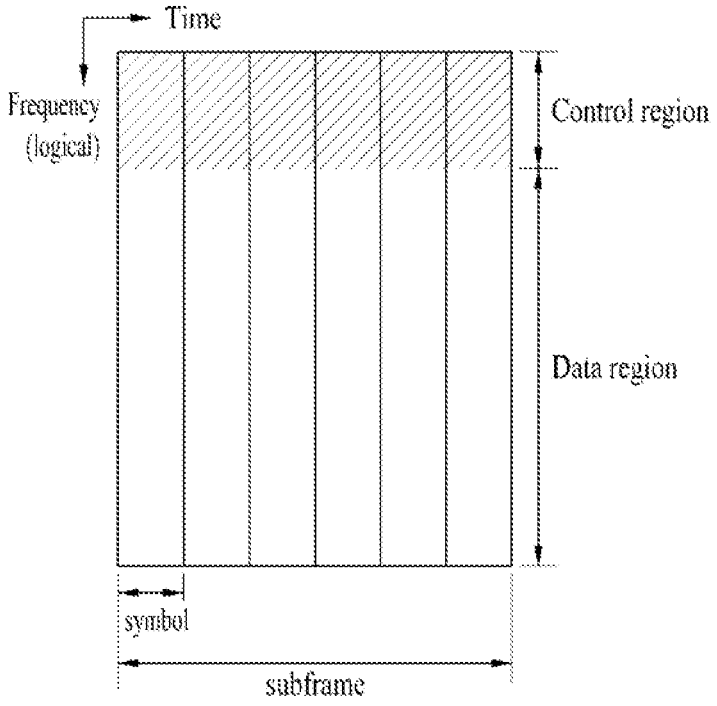
FIG. 18 is a view showing an example of a control region to which an A-MAP can be transmitted in IEEE 802.16.

FIG. 18 is a view showing an example of a control region to which an A-MAP can be transmitted in IEEE 802.16.

In IEEE 802.16m, an A-MAP is transmitted per downlink subframe. In a case in which flexible/fractional frequency reuse (FFR) is applied to a downlink subframe, logical resource units (LRUs) of the downlink subframe are divided into one or more frequency partitions in a frequency domain. An A-MAP may be allocated to a reuse-1 partition and/or a power-boosted reuse-3 partition.

An A-MAP carries service control information. The service control information includes user specific control information and non-user specific control information. The user specific control information may divided into assignment information, HARQ feedback information, and power control information, which are transmitted via an assignment A-MAP, a HARQ feedback A-MAP, and a power control A-MAP, respectively. All of the A-MAPs share a physical resource region called an A-MAP region.

The A-MAP region is present in every downlink subframe. When a default TTI is used, downlink data may occupy resources in a frequency partition of a subframe in which the A-MAP region is located.

Figure 19:
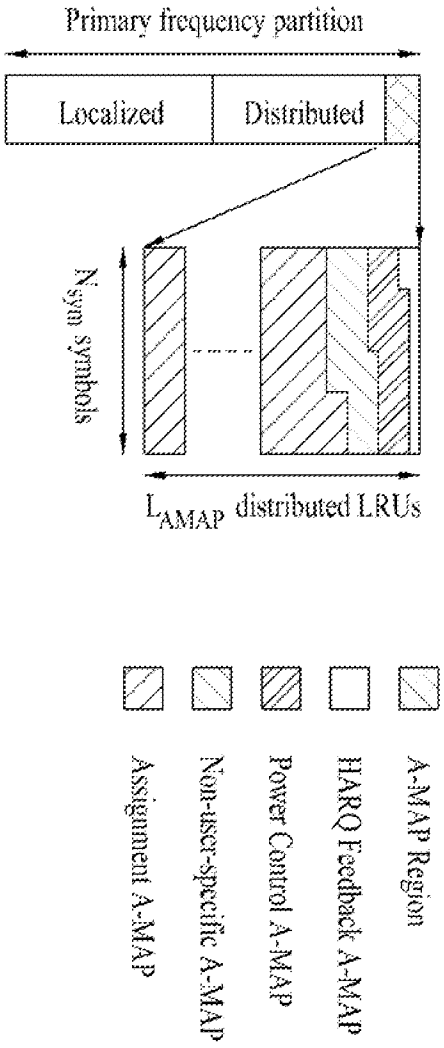
FIG. 19 is a view showing an example of the structure of an A-MAP region in a primary frequency partition according to IEEE 802.16.

FIG. 19 is a view showing an example of the structure of an A-MAP region in a primary frequency partition according to IEEE 802.16.

According to current IEEE 802.16, an A-MAP region is present at a Distributed Logical Resource Unit (DLRU) position in a primary frequency partition, such as a reuse-1 partition or a power-boosted reuse-3 partition.

For example, in the case of a subframe of a superframe except a first subframe, an A-MAP region includes initial $L_{AMAP}$ DLRUs. On the other hand, in the case of the first subframe of the superframe, an A-MAP region includes $L_{AMAP}$ DLRUs following the initial $L_{AMAP}$ DLRUs occupied by an SFH. LRUs are formed from Physical Resource Units (PRUs). Each PRU is a basic physical unit of resource assignment including $P_{sc}$ successive subcarriers and $N_{syn}$ successive OFDMA symbols. For example, each PRU may include $P_{sc}$=18 subcarriers, and may include $N_{sym}$=6, 7, and 5 OFDMA symbols with respect to type-1, type-2, and type-3 subframes, respectively. Each LRU is a basic unit for distributed or localized resource assignment. A resource occupied by each A-MAP may be changed depending upon system configuration and scheduler operation.

Referring to FIG. 19, ACK/NACK information for uplink data transmission is transmitted to a user equipment through a HARQ feedback A-MAP (HF-A-MAP).

In an FDD, an HF-A-MAP region is provided per downlink subframe.

On the assumption that, in a TDD, a set of uplink subframe indices have a relationship of $m_0<m_1<\ldots<m_{K-1}$ is $M=\{m_0, m_1, \ldots, m_{K-1}\}$, the number of HF-A-MAP regions in a downlink subframe is equal to the number of the uplink subframes associated with HARQ feedback, i.e. K based on the size of the set M.

According to IEEE 802.16m, an HF-A-MAP, through which ACK/NACK information is transmitted in each HF-A-MAP region, may be decided by a UL basic assignment A-MAP information element (IE), a UL subband assignment A-MAP IE, a CDMA allocation A-MAP IE, a feedback polling A-MAP IE, and a UL persistent allocation A-MAP IE, for example, as follows.

$$k=(M(j)+n)\bmod N_{HF\text{-}A\text{-}MAP} \qquad \text{Equation 22}$$

Where, k indicates an HF-A-MAP resource index, and $N_{HF\text{-}A\text{-}MAP}$ indicates a total number of HF-A-MAP channels configured per HF-A-MAP region. j indicates an HF-A-MAP index parameter in a non-user specific A-MAP IE. The HF-A-MAP index parameter indicates which transmission parameter is to be used to calculate the HF-A-MAP index. In a case in which j in the non-user specific A-MAP IE is 0, an STID is used as a value of the M(j) with respect to the UL basic assignment A-MAP information element (IE) and the subband assignment A-MAP IE, and a Random Access Identifier (RA-ID) is used as a value of the M(j) with respect to the CDMA allocation A-MAP IE. On the other hand, in a case in which j in the non-user specific A-MAP IE is 1, the lowest LRU index of corresponding uplink transmission is used as a value of the M(j). In the UL persistent allocation A-MAP IE and the feedback polling A-MAP IE, M(j) is always STID irrespective of a value of j. n indicates a 3-bit HARQ Feedback Allocation (HFA) value signaled via each assignment A-MAP IE.

In a case in which the HF-A-MAP resource index is decided as described above, a specific node may transmit ACK/NACK information to a plurality of user equipments using the same HF-A-MAP resource unless nodes set HF-A-MAP through coordinated scheduling so that the HF-A-MAPs do not overlap. In the same manner as in the above description of [3GPP LTE-A], therefore, the present invention reflects $n^{DL}_{offset}$, which is a value decided by reflecting one or more of the above paragraphs (1) to (7), to allocate/map an HF-A-MAP resource. The base station processor 400b according to the present invention may decide an HF-A-MAP resource index k according to, for example, the following expression.

$$k=(M(j)+n+n_{offset}^{DL})\bmod N_{HF\text{-}A\text{-}MAP} \qquad \text{Equation 23}$$

Under control of the base station processor 400b, the resource element mapper 305 of the base station may map the ACK/NACK information for the user equipment to a resource corresponding to the HF-A-MAP resource index k. Under control of the base station processor 400b, the transmitter 100b of the base station may transmit the ACK/NACK information on the resource corresponding to the HF-A-MAP resource index k.

According to the ACK/NACK transmission method 1 as described above, an offset value specified for each user equipment is reflected upon resource mapping/allocation of a control channel for ACK/NACK transmission, thereby preventing uplink/downlink ACK/NACK information for a plurality of user equipments from being transmitted through the same resource. Consequently, interference between ACK/NACK signals is reduced, and therefore, the ACK/NACK signals can be stably transmitted to a base station and the user equipments.

ACK/NACK Transmission Method 2—New Resource Allocation Method of ACK/NACK

According to current 3GPP LTE/LTE-A, a PHICH uses the same antenna port as a Physical Broadcast Channel (PBCH), and therefore, the PHICH can be transmitted only through a single antenna or transmit diversity. As described with reference to FIG. 12, a PHICH uses code division multiplexing (CDM), and therefore, ACK/NACK information regarding a maximum of $2N^{PHICH}_{SF}$ user equipments can be transmitted as a group. That is, a plurality of user equipments that simultaneously transmits data using a PUSCH resource may be provided.

A PHICH resource, through which ACK/NACK information regarding a PUSCH of each user equipment is transmitted, is divided into a PHICH group and an orthogonal sequence. In a case in which the PHICH resource is decided by an index pair ($n^{group}_{PHICH}$, $n^{seq}_{PHICH}$), however, ACK/NACK information regarding uplink transmission of different user equipments may be mapped to the same PHICH resource in multi-node coordinated transmission. For example, if $I^{lowest_index}_{PRB_RA}$ of $PUSCH_{UE1}$ transmitted by UE1 and $I^{lowest_index}_{PRB_RA}$ of $PUSCH_{UE2}$ transmitted by UE2 are the same, and $n_{DMRS}$ of the $PUSCH_{UE1}$ and $n_{DMRS}$ of the $PUSCH_{UE2}$ are the same, ACK/NACK information regarding the $PUSCH_{UE1}$ and ACK/NACK information regarding the $PUSCH_{UE2}$ are allocated to the same PHICH resource. As a result, interference occurs in ACK/NACK transmission for different user equipments, and therefore, reliability of ACK/NACK transmission is lowered.

In order to solve this problem, the ACK/NACK transmission method 2 according to the present invention also divides a PHICH resource into a spatial dimension as well as $n^{group}_{PHICH}$ and $n^{seq}_{PHICH}$.

Figure 20:
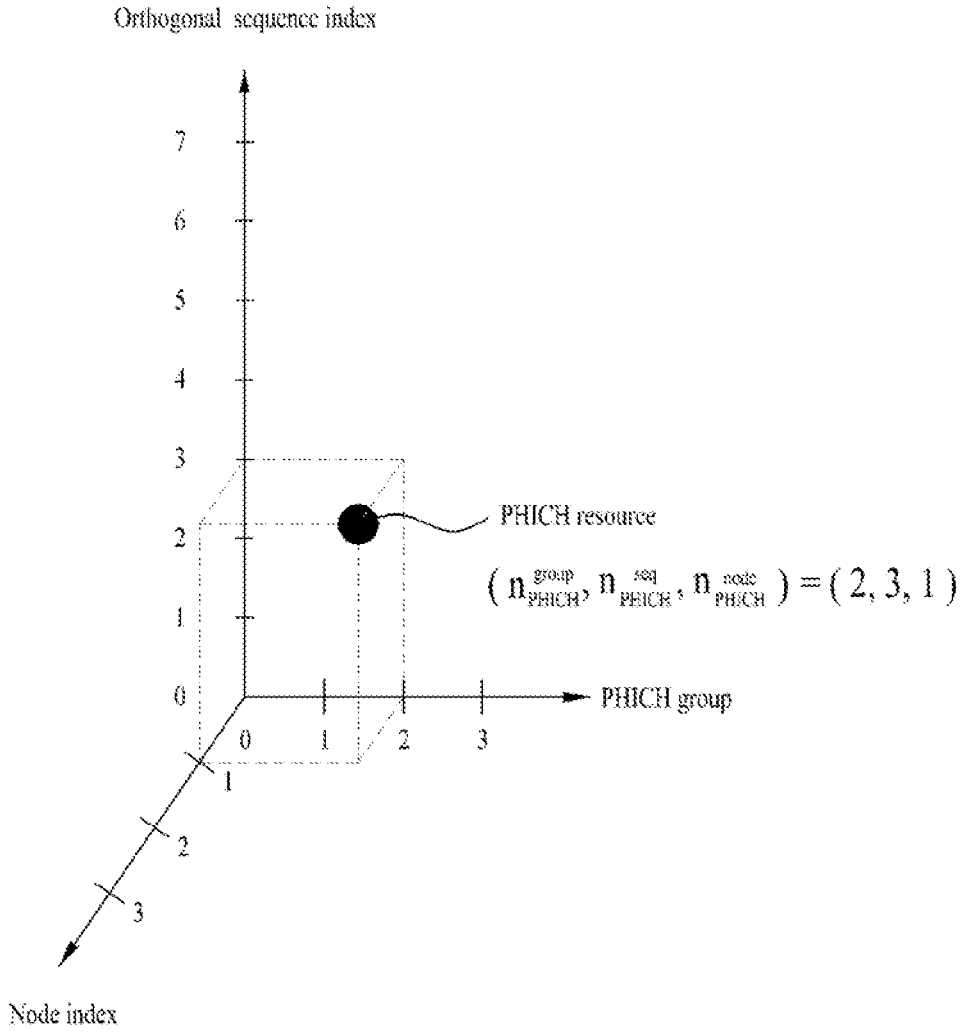
FIG. 20 is a view showing an example of PHICH transmission in multi-node coordinated transmission.

FIG. 20 is a view showing an example of PHICH transmission in multi-node coordinated transmission.

Referring to FIG. 20, a PHICH resource (see FIG. 12), which is divided into a PHICH group and an orthogonal sequence, is also divided into a node, which is a space resource. In FIG. 20, $n^{code}_{PHICH}$ is a value specifying a space resource, to which a PHICH is transmitted. The base station processor 400b according to the present invention is configured to also divide and allocate a PHICH according to a node, which is a space resource. Under control of the base station processor 400b, the precoder 304 of the base station may distribute a PHICH of a user equipment to a corresponding node, and the resource element mapper 305 of the base station may map the PHICH to time and frequency resources of a corresponding PHICH group. Under control of the base station processor 400b, the transmitter 100b of the base station transmits the PHICH on the resource through the corresponding node.

According to the ACK/NACK transmission method 2 of the present invention, therefore, a specific PHICH resource is also divided into $n^{node}_{PHICH}$ specifying a space resource as well as $n^{group}_{PHICH}$ specifying time and frequency resources and $n^{seq}_{PHICH}$ specifying a code resource. On the assumption that the number of nodes participating in multi-node coordinated transmission is $n^{PHICH}_{node}$, the number of PHICH resources may be extended to $N_{PHICH}=N^{group}_{PHICH}\times 2N^{PHICH}_{SF}\times N^{PHICH}_{node}$. Consequently, a maximum of $N_{PHICH}$ divided pieces of ACK/NACK information may be transmitted.

In a case in which two or more PUSCHs having the same time resource and frequency resources, and $n_{DMRS}$ are present in allocating ACK/NACK information to time, frequency, and space resources, the processor 400b of the base station according to the present invention is configured to allocate ACK/NACK information regarding the two or more PUSCHs to different nodes.

On the assumption that the number of ACK/NACK signals to be transmitted by nodes participating in multi-node coordinated transmission is i, the i ACK/NACK signals may be allocated, for example, first to one of $N^{group}_{PHICH}$ PHICH groups, may be allocated to one of $2N^{PHICH}_{SF}$ orthogonal sequences in the PHICH group, and may be allocated to at least one of $N^{PHICH}_{node}$ nodes in the orthogonal sequence in the PHICH group.

As another example, the i ACK/NACK signals may be allocated to one of $N^{group}_{PHICH}$ PHICH groups, may be allocated to at least one node of $N^{PHICH}_{node}$ nodes in the PHICH group, and may be allocated to one of $2N^{PHICH}_{SF}$ orthogonal sequences in the node in the PHICH group.

As yet another example, the i ACK/NACK signals are allocated to at least one node of $N^{PHICH}_{node}$ nodes, but ACK/NACK signals having the same time resource, frequency resources, and $n_{DMRS}$ of PUSCHs are allocated to different nodes. ACK/NACK signals allocated to each node may be allocated to one of $N^{group}_{PHICH}$ PHICH groups, and may be allocated to one of $2N^{PHICH}_{SF}$ orthogonal sequences in the PHICH group.

Hereinafter, the ACK/NACK transmission method 2 will be described using a DAS, which is one of the multi-node coordinated transmission methods, as an example. In PUSCH transmission in a specific DAS, it is assumed that an antenna node is designated for each user equipment, and each user equipment transmits a PUSCH to the designated antenna port. That is, user equipments perform uplink MU-MIMO transmission of PUSCHs using a plurality of antenna nodes. In this case, the user equipments may simultaneously transmit uplink data PUSCH resources having the same time and frequency. Afterward, the base station generates ACK/NACK information regarding received PUSCHs. The ACK/NACK information is transmitted to each user equipment through a PHICH at a position decided according to, for example, Equation 16. At this time, user equipments having the same PHICH group index and sequence index may be present. The ACK/NACK transmission method 2 of the present invention redistributes the user equipments overlapped at PHICH resources having the same PHICH group index and sequence index according to an antenna node/antenna port index to transmit the PHICHs of the overlapped user equipments for each node or each antenna port.

To this end, a base station(s) performing multi-node coordinated transmission may previously perform scheduling so that user equipment having the same PHICH group index and sequence index belong to different nodes or antennas, antenna nodes, or antenna ports. That is, the base station(s) performing multi-node coordinated transmission may distribute the user equipment having the same PHICH group index and sequence index to different antennas, antenna nodes, or antenna ports according to Equation 16.

In order to allocate only one user equipment to a PHICH resource having a certain PHICH group index and sequence index, if a plurality of PUSCHs having the same $I^{lowest_index}_{PRB_RA}$ is present, PHICHs to PUSCHs having the same $I^{lowest_index}_{PRB_RA}$ may be allocated to different antennas, antenna nodes, or antenna ports. Alternatively, in further consideration of $n_{DMRS}$, PHICHs to PUSCHs having the same $I^{lowest_index}_{PRB_RA}$ and $n_{DMRS}$ may be allocated to different antennas, antenna nodes, or antenna ports. For example, according to Equation 16, ACK/NACK signals regarding PUSCHs having the same $I^{lowest_index}_{PRB_RA}$ (and $n_{DMRS}$) are mapped to PHICH resources having the same PHICH group number and orthogonal sequence index (hereinafter, referred to as the same PHICH resources). The ACK/NACK signals mapped to the same PHICH resources are spread by an orthogonal sequence corresponding to the orthogonal sequence index, and are multiplexed to the PHICH group together with other ACK/NACK signals belonging to a PHICH group corresponding to the PHICH group number. However, the ACK/NACK signals mapped to the same PHICH resources are allocated to different nodes to avoid interference therebetween. The base station processor 400b may decide a PHICH sequence and a PHICH group to which the ACK/NACK signals are to be transmitted according to Equation 16. The base station processor 400b spreads the ACK/NACK signals using the PHICH sequence, and multiplexes the ACK/NACK signals to the PHICH group using another PHICH sequence belonging to the same PHICH group as the ACK/NACK signals. At this time, the base station processor 400b may allocate the same PHICH resources, i.e. PHICHs belonging to the same PHICH group and spread by the same PHICH sequence, to different nodes. Under control of the base station processor 400b, the transmitter 100b of the base station may transmit the ACK/NACK signals on time and frequency resources corresponding to the PHICH group through the allocated corresponding node.

When examining the ACK/NACK transmission method 2 in terms of a node, antenna, antenna node, or antenna port, PHICHs transmitted for nodes may be different from each other. A node, antenna, antenna node, or antenna port transmits ACK/NACK information regarding at most one PUSCH through a PHICH resource including a PHICH group index and a sequence index.

When examining the ACK/NACK transmission method 2 in terms of user equipments, each PHICH group corresponds to a user equipment group including one or more user equipments. It seems that ACK/NACK information regarding PUSCHs of user equipments belonging to a corresponding user equipment group is multiplexed to a PHICH group. Nodes/antennas, antenna nodes, or antenna ports, to which PHICH is transmitted, may be different for each user equipment.

Meanwhile, in distributing a PHICH to a node, antenna, antenna node, or antenna port, the following embodiments may be applied.

Mapping to a Space Resource of a PHICH

Embodiment 1

A PHICH may be allocated to a node used in communication with a user equipment, which is one of a plurality of nodes participating in multi-node coordinated communication. A node, antenna, antenna node, or antenna port allocating a PHICH may be identical to an uplink reception and/or downlink transmit antenna, antenna node, or antenna port which a base station designates with respect to each user equipment. That is, a PHICH may be allocated to a node, antenna, antenna node, or antenna port identical to a PUSCH reception or PDSCH transmission node, antenna, antenna node, or antenna port.

For example, it is assumed that UE1 performs uplink transmission to Node 1, and UE2 performs uplink transmission to Node 2. The base station may transmit a PHICH to a PUSCH received by Node 1 to Node 1 and may transmit a PHICH to a PUSCH received by Node 2 to Node 2. A time resource, a frequency resource, and an orthogonal sequence resource, to which each PHICH is transmitted, may be decided according to, for example, Equation 16.

Embodiment 2

Figure 21:
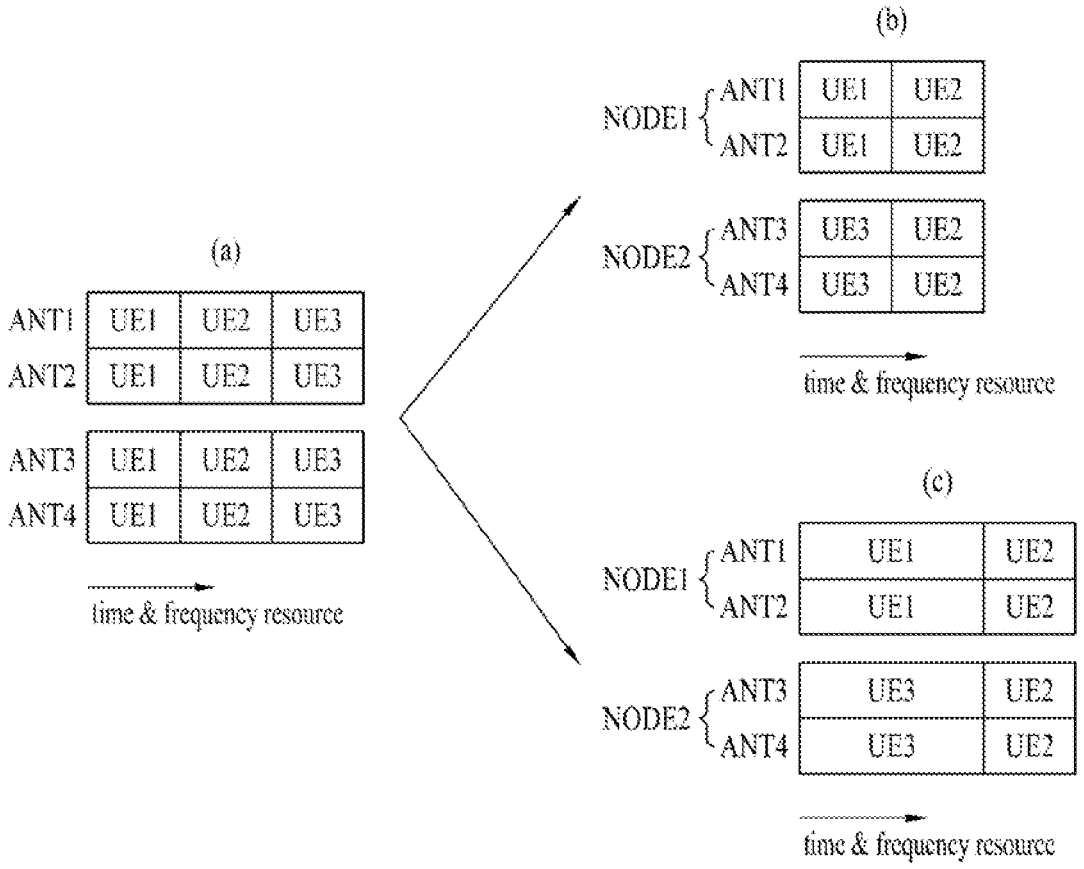
FIG. 21 is a view showing an example of PDCCH transmission in multi-node coordinated communication.

As shown in FIG. 21, in a case in which a PDCCH for a different user equipment or user equipment group for each node, antenna, antenna node, or antenna port is transmitted, it may be prescribed that a PHICH is transmitted using an antenna, antenna node, or antenna port identical to the antenna, antenna node, or antenna port transmitting the PDCCH.

FIG. 21 is a view showing an example of PDCCH transmission in multi-node coordinated communication. In a DAS including antenna node 1 consisting of ANT1 and ANT2 and antenna node 2 consisting of ANT3 and ANT4, on the assumption that UE2 is within coverage of antenna node 1 and coverage of antenna node 2, UE1 is within coverage of antenna node 1, and UE3 is within coverage of antenna node 2, a PDCCH may be transmitted according to (a), (b), or (c) of FIG. 21.

Referring to FIG. 21(a), all antennas of the base station transmit PDCCHs for UE1, UE2, and UE3 in the same time and frequency domains. That is, the respective antennas of the base station transmit PDCCHs of UE1, UE2, and UE3 at a predetermined time using a predetermined frequency.

Referring to FIGS. 21(b) and 21(c), PDCCHs for UE1, UE2, and UE3 may not be transmitted through the respective antennas in the same time and frequency domains, but PDCCHs for different user equipments or user equipment groups for each node may be transmitted. For example, Node 1 may transmit PDCCHs of UE1 and UE2 on predetermined time and frequency resources, and Node 2 may transmit PDCCHs of UE2 and UE3 on the predetermined time and frequency resources. A PDCCH for UE2 affected by all nodes participating in multi-node coordinated transmission is transmitted from Node 1 and Node 2 using a predetermined resource. UE1 affected by Node 1 consisting of ANT1 and ANT2 is transmitted from Node 1 using a resource identical to the predetermined resource. UE3 affected by Node 2 consisting of ANT3 and ANT4 is transmitted from Node 3 using a resource identical to the predetermined resource. If PDCCHs are differently configured and transmitted for each node, antenna, antenna node, or antenna port as described above, it is possible to reduce resources to be allocated to PDCCHs or to support more user equipments using predetermined resources reserved for PDCCHs as shown in FIG. 2(b). Otherwise, as shown in FIG. 21(c), it is possible to transmit control information while increasing the amount of the control information using the predetermined resources. Consequently, it is possible to improve efficiency of control information transmission through the control region by differently setting a user equipment(s) allocated to the control region for each node, antenna, antenna node, or antenna port.

User equipment groups are divided according to nodes, and each node transmits a PHICH to a PUSCH transmitted for each antenna, antenna node, or antenna port. User equipment groups to transmit PHICHs may be different from each other for each antenna, antenna nodes, or antenna ports, and nodes receiving PHICHs for PUSCHs may be different from each other for each user equipment. For example, when two nodes participating in multi-node coordinated transmission are present, a user equipment may receive PHICHs from the two nodes, and another user equipment may receive a PHICH from only one of the two nodes. That is, a user equipment may be allocated to several nodes so long as another user equipment having the same PHICH group index and sequence index is not present.

Referring to FIGS. 21(b) and 21(c), Node 1 participating in multi-node coordinated transmission may be scheduled to transmit a PHICH of UE1 and a PHICH of UE2 on corresponding PHICH resources, and Node 2 may be scheduled to transmit a PHICH of UE2 and a PHICH of UE3 on corresponding PHICH resources. A predetermined PHICH resource, on which each node transmits a PHICH, may be decided according to, for example, Equation 16.

Embodiment 3

It is also possible to allocate a PHICH to a node, antenna, antenna node, or antenna port and to transmit information (hereinafter, referred to as node information) designating a node, antenna, antenna node, or antenna port allocated for PHICH transmission without consideration of a PUSCH reception node and/or a PUSCH transmission node (embodiment 1) and a PDCCH transmission node (embodiment 2). The node information may be contained in a DCI and may be transmitted to a user equipment through a PDCCH or a PDSCH.

For example, in a case in which node information in a PDCCH for UE1 designates antenna port 0, and node information in a PDCCH for UE2 designates antenna port 1, a PHICH of UE1 may be transmitted from antenna port 0, and a PHICH of UE2 may be transmitted from antenna port 1.

Signaling of Node Information

In a case in which a PHICH is multiplexed using multiple nodes, a user equipment must recognize a node transmitting a PHICH thereof (hereinafter, referred to as node information) to detect a PHICH thereof from among a plurality of PHICHs. Hereinafter, embodiments of a user equipment recognizing a node transmitting a PHICH thereof will be described.

Embodiment X

Clear Signaling

A base station(s) participating in multi-node coordinated transmission may clearly transmit node information allocated for PHICH transmission to a corresponding user equipment(s). For example, the node information may be contained in a DCI and may be transmitted to a user equipment through a PDCCH or a PDSCH. Alternatively, a base station(s) participating in multi-node coordinated transmission may broadcast node information transmitting PHICHs of user equipments to user equipments within coverage thereof. The node information may be transmitted through a PBCH in the form of a broadcast message.

The node information may include a node index for a corresponding user equipment or a downlink reference signal pattern index which the corresponding user equipment is to receive. A downlink reference signal may include a Cell-specific Reference Signal (CRS), a Demodulation Reference Signal (DMRS), and a Channel Status Information Reference Signal (CSI-RS).

The base station processor 400b may generate the node information and may control the base station transmitter 100b to transmit the node information to a user equipment.

When a base station(s) participating in multi-node coordinated transmission transmits node information for PHICH transmission, a user equipment may detect a PHICH thereof on a control region using a reference signal corresponding to a node allocated thereto.

Specifically, the user equipment detects at least one PHICH group transmitted by a node having transmitted a PHICH thereof $n_{DMRS}$ is a value signaled from a base station to a user equipment, and $I^{lowest_index}_{PRB_RA}$ is a value that the user equipment can see from a PRB used to transmit a PUSCH thereof. Consequently, it is possible for the user equipment to detect a PHICH thereof from the at least one PHICH group using Equation 16.

It is possible for the user equipment processor 400a to detect a node having transmitted a PHICH thereof based on the node information received from the base station. Also, it is possible for the user equipment processor 400a to detect a PHICH group thereof, to which the PHICH thereof belongs, from among one or more PHICH groups transmitted by the node having transmitted the PHICH thereof based on PHICH group number and to detect the PHICH thereof from among a plurality of PHICHs in the PHICH group thereof based on an orthogonal sequence index. It is possible for the user equipment processor 400a to recognize a PHICH group number and an orthogonal sequence using, for example, Equation 16.

In this way, the base station can directly transmit information indicating a node transmitting a PHICH to a user equipment. In order to reduce signaling overhead, on the other hand, signaling may be implicitly performed using an indirect method, such as embodiment 2 or embodiment 3.

Embodiment Y

Masking for Each Node

A base station may transmit a PHICH to each user equipment in a state in which the PHICH is masked using an identifier or index assigned to each node. The processor 400b of the base station may mask the PHICH of the user equipment using an identifier or index of an antenna group, to which the PHICH of the user equipment will be transmitted. For example, the processor 400b may mask (for example, XOR operate) a sequence corresponding to an identifier or index of a corresponding node with respect to a 16-bit Cyclic Redundancy Check (CRC) so that the masked CRC can be added to the PHICH of the user equipment.

The base station processor 400b channel-codes the PHICH masked with the identifier or index of the node to generate coded data and multiplexes PHICHs of user equipments to be transmitted together with a predetermined node to one or more PHICH groups (S130). At the predetermined node, the PHICHs may be differentiated from each other by the PHICH group and sequence index. The multiplexed PHICHs are transmitted on a predetermined resource region through the predetermined antenna or antenna node via the transmitter 100b of the base station, the scrambler 301, the modulation mapper 302, the layer mapper 303, the precoder 304, the resource element mapper, and the OFDMA signal generator 306.

The user equipment may configure nodes that can transmit thereto and may recognize a PHICH transmitted thereto through demasking of the PHICHs received by the user equipment using an identifier or index of each node configured as described above. The user equipment may recognize that a PHICH thereof is contained in a PHICH(s) transmitted from the successfully demasked node. The processor 400a of the user equipment may configure a candidate group of nodes that can be allocated to the user equipment. The processor 400a of the user equipment may demask PHICHs transmitted on the control region using an identifier or index of each node to confirm whether a CRC error is detected. The processor 400a of the user equipment may recognize that a node having identifier or index, a CRC error of which has not been detected, has transmitted a PHICH of the user equipment.

The processor 400a of the user equipment may detect a PHICH thereof from among PHICHs belonging to one or more PHICH groups transmitted by the node using Equation 16. That is, the processor 400a of the user equipment may determine through which PHICH resource a PHICH thereof, which is one of the PHICHs transmitted from a specific node, has been transmitted according to Equation 16.

According to embodiment Y of the present invention, it is possible for a user equipment to find a space resource from which a PHICH corresponding thereto is transmitted although a base station does not clearly inform the user equipment of a node from which a PHICH has been transmitted. Specifically, the user equipment may configure a receiving filter through all possible combinations of nodes in a state in which the position of a node transmitting a PHICH and/or the number of nodes is not recognized, and may demask a signal having passed through the receiving filter using an identifier or index of each node to recognize a node having transmitted a PHICH thereof.

Embodiment Z

Scrambling for Each Node

A base station may scramble a PHICH of a user equipment with a sequence corresponding to a node transmitting the PHICH of the user equipment and may then transmit the PHICH of the user equipment. A scrambling sequence having low correlation may be defined with respect to each node.

The base station processor 400b may control the scrambler 301 to scramble PHICHs to be transmitted through the same node with a scrambling sequence corresponding to the node. The scrambled PHICHs are transmitted on predetermined PHICH resources through the node via the modulation mapper 302, the layer mapper 303, the precoder 304, the resource element mapper, and the OFDMA signal generator 306.

The user equipment may descramble the received signals with a scrambling sequence of each node to recognize that a PHICH thereof has been multiplexed to one of the received signals having great intensity. The processor 400a of the user equipment may configure a candidate group of nodes that can be allocated to the user equipment. Under control of the processor 400a of the user equipment, the receiver 300a of the user equipment may perform descrambling with an identifier or index of a node belonging to the candidate group. As a result of descrambling, the processor 400a of the user equipment may recognize that a PHICH of the user equipment is included in a PHICH group having more than a predetermined level of signal intensity. In addition, the processor 400a may recognize that the node corresponding to the scrambling sequence having more than the predetermined level of signal intensity is a node having transmitted the PHICH of the user equipment. That is, the user equipment may indirectly acquire node information using a scrambling sequence assigned to each node.

Meanwhile, the processor 400a of the user equipment may detect a PHICH thereof from among PHICHs belonging to one or more PHICH groups transmitted by the node using Equation 16. That is, it is possible for the processor 400a of the user equipment to determine through which PHICH resource a PHICH thereof, which is one of the PHICHs transmitted from a specific node, has been transmitted according to Equation 16.

In embodiment Z, the user equipment receives a PHICH using sequences corresponding to various combinations of all nodes given in the system in a state in which a node allocated to the user equipment is not recognized. The user equipment may recognize $N_{upper}$ nodes or node groups having relatively high receiving performance as node(s) allocated thereto or may decide an arbitrary number of nodes as a node candidate group for the user equipment. An integer $N_{upper}$ may be prescribed as a standard, may be transmitted through a PSCH, etc. as a system parameter, or may be transmitted through a PDCCH, a Physical Downlink Shared CHannel (PDSCH), etc. as control information.

According to the ACK/NACK transmission method 2 of the present invention, it is not necessary to revise a resource allocation rule of an ACK/NACK transmission channel, and therefore, it is possible to naturally solve a transmission channel resource overlap problem between the conventional user equipments designed without consideration of multi-node coordinated communication which may occur when applying the ACK/NACK transmission method 1 and improved user equipments designed according to multi-node coordinated communication.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be used in a multi-node system providing a communication service to a user equipment or a user equipment group through a plurality of nodes.

The invention claimed is:

1. A method of transmitting, by a base station controlling at least one of a plurality of nodes, [a ACKnowledgement/Negative-ACKnowledgement] *an acknowledgement/negative-acknowledgement* (ACK/NACK) signal to a user equipment being capable of simultaneously receiving signals from the plurality of nodes, the method comprising:

allocating a resource to an ACK/NACK channel carrying the ACK/NACK signal using an offset $n^{DL}_{offset}$ specific to the user equipment; and transmitting the ACK/NACK channel on the resource, wherein the offset $n^{DL}_{offset}$ is a value [decided] *determined* based on at least one [from among] *of:* a value defined by an upper layer with respect to the user equipment, an identifier of a node used in uplink transmission in response to which the ACK/NACK signal is transmitted, a type of the node used in the uplink transmission, an identifier of a node to be used in transmission of the ACK/NACK signal, a type of the node used in the transmission of the ACK/NACK signal, a pattern index of a reference signal allocated to the user equipment, or a multiplexing sequence of a resource used in the uplink transmission,

*wherein, based on the ACK/NACK channel being a hybrid automatic retransmission request feedback A-MAP (HF-A-MAP) channel in the HF-A-MAP region, a resource index of the HF-A-MAP channel satisfies the following:* $k=(M(j)+n+n_{offset}^{DL})\bmod N_{HF\text{-}A\text{-}MAP}$, *and*

*wherein* $N_{HF\text{-}A\text{-}MAP}$ *denotes a total number of HF-A-MAP channels configured per HF-A-MAP region, and j denotes a HF-A-MAP index parameter in a non-user specific A-MAP IE.*

2. The method [according to] *of* claim 1, wherein the ACK/NACK channel is a [Physical Hybrid] *physical hybrid* automatic retransmit request [Indicator Channel (PHICH),] *indicator channel (PHICH):* a PHICH group number, to which the PHICH belongs, [is decided according to] *satisfies* the following[equation,]:

$$n_{PHICH}^{group}=(I_{PRB_RA}^{lowest_index}+n_{DMRS}+n_{offset}^{DL})\bmod N_{PHICH}^{group}+I_{PHICH}N_{PHICH}^{group},$$

[and/or]

an orthogonal sequence index applied to the PHICH [is decided according to] *satisfies* the following[equation,]:

$$n_{PHICH}^{seq}=(\lfloor I_{PRB_RA}^{lowest_index}/N_{PHICH}^{group}\rfloor+n_{DMRS}+n_{offset}^{DL})\bmod 2N_{SF}^{group},\ \textit{and}$$

[where, $I^{lowest_index}_{PRB_RA}$ indicates a minimum Physical Resource Block]

*wherein* $I^{lowest_index}_{PRB_RA}$ *denotes a minimum physical resource block* (PRB) index in a first slot used in the uplink transmission, $I_{PHICH}$ is set to 1 for a time division duplex (TDD) uplink/downlink configuration 0 performing the uplink transmission at a subframe n=4 or 9 and to 0 for the other configurations, $N^{group}_{PHICH}$ [indicates the] *denotes a* number of PHICH groups configured by an upper layer, $n_{DMRS}$ [is a value indicating] *denotes* a cyclic shift applied to a [DeModulation Reference Signal] *demodulation reference signal* (DMRS) for the uplink transmission, and $N^{PHICH}_{SF}$ [indicates] *denotes* a spreading factor used in PHICH modulation.

[3. The method according to claim 1, wherein the ACK/NACK channel is a Hybrid automatic retransmission request Feedback A-MAP (HF-A-MAP) channel in an HF-A-MAP region, and a resource index of the HF-A-MAP channel is decided according to the following equation, $$k=(M((j)+n+n_{offset}^{DL})\bmod N_{HF\text{-}A\text{-}MAP}$$

where, $N_{HF\text{-}A\text{-}MAP}$ indicates a total number of HF-A-MAP channels configured per HF-A-MAP region, and j indicates an HF-A-MAP index parameter in a non-user specific A-MAP IE.]

4. A base station for transmitting an [ACKnowledgement/Negative-ACKnowledgement] *acknowledgement/negative-acknowledgement* (ACK/NACK) signal to a user equipment being capable of simultaneously receiving signals from a plurality of nodes, wherein the base station controls at least one of the plurality of nodes, the base station comprising:

[a processor configured to allocate a resource to an ACK/NACK channel carrying the ACK/NACK signal using an offset $n^{DL}_{offset}$ specific to the user equipment; and a transmitter configured to transmit the ACK/NACK channel on the resource under control of the processor, wherein the offset $n^{DL}_{offset}$ is a value decided based on at least one from among a value defined by an upper layer with respect to the user equipment, an identifier of a node used in uplink transmission in response to which the ACK/NACK signal is transmitted, a type of the node used in the uplink transmission, an identifier of a node to be used in transmission of the ACK/NACK signal, a type of the node used in the transmission of the ACK/NACK signal, a pattern index of a reference signal allocated to the user equipment, or a multiplexing sequence of a resource used in the uplink transmission.]

*a transmitter;*

*a receiver; and*

*at least one processor coupled with the transmitter and receiver,*

*wherein the at least one processor is configured to:*

*allocating a resource to an ACK/NACK channel carrying the ACK/NACK signal using an offset* $n^{DL}_{offset}$ *specific to the user equipment; and*

*transmitting the ACK/NACK channel on the resource,*

*wherein the offset* $n^{DL}_{offset}$ *is a value determined based on at least one from among a value defined by an upper layer with respect to the user equipment,*

*an identifier of a node used in uplink transmission in response to which the ACK/NACK signal is transmitted,*

*a type of the node used in the uplink transmission,*

*an identifier of a node to be used in transmission of the ACK/NACK signal,*

*a type of the node used in the transmission of the ACK/NACK signal,*

*a pattern index of a reference signal allocated to the user equipment, or*

*a multiplexing sequence of a resource used in the uplink transmission,*

*wherein, based on the ACK/NACK channel being a hybrid automatic retransmission request feedback A-MAP (HF-A-MAP) channel in the HF-A-MAP region, a resource index of the HF-A-MAP channel satisfies the following:*

$$k=(M(j)+n+n_{offset}^{DL})\bmod N_{HF\text{-}A\text{-}MAP},\ \textit{and}$$

*wherein* $N_{HF\text{-}A\text{-}MAP}$ *denotes a total number of HF-A-MAP channels configured per HF-A-MAP region, and j denotes a HF-A-MAP index parameter in a non-user specific A-MAP IE.*

5. The base station [according to] *of* claim 4, [wherein the ACK/NACK channel is a Physical Hybrid automatic retransmit request Indicator Channel (PHICH), and the processor is configured so that a PHICH group number, to which the PHICH belongs, is decided according to the following equation, $$n_{PHICH}^{group}=(I_{PRB_RA}^{lowest_index}+n_{DMRS}+n_{offset}^{DL})\bmod N_{PHICH}^{group}+I_{PHICH}N_{PHICH}^{group}$$

and/or an orthogonal sequence index applied to the PHICH is decided according to the following equation, $$n_{PHICH}^{seq}=(\lfloor I_{PRB_RA}^{lowest_index}/N_{PHICH}^{group}\rfloor+n_{DMRS}+n_{offset}^{DL})\bmod 2N_{SF}^{group}$$

where, $I^{lowest_index}_{PRB_RA}$ indicates a minimum Physical Resource Block (PRB) index in a first slot used in the uplink transmission, $I_{PHICH}$ is set to 1 for a time division duplex (TDD) uplink/downlink configuration 0 performing the uplink transmission at a subframe n=4 or 9 and to 0 for the other configurations, $N^{group}_{PHICH}$ indicates the number of PHICH groups configured by an upper layer, $n_{DMRS}$ is a value indicating a cyclic shift applied to a DeModulation Reference Signal (DMRS) for the uplink transmission, and $N^{PHICH}_{SF}$ indicates a spreading factor used in PHICH modulation.]

*wherein, based on the ACK/NACK channel being a physical hybrid automatic retransmit request indicator channel (PHICH):*

*a PHICH group number, to which the PHICH belongs, is decided according to the following:*

$$n_{PHICH}^{group}=(I_{PRB_RA}^{lowest_index}+n_{DMRS}+n_{offset}^{DL})\bmod N_{PHICH}^{group}+I_{PHICH}N_{PHICH}^{group}$$

*an orthogonal sequence index applied to the PHICH is decided according to the following:*

$$n_{PHICH}^{seq1}=(\lfloor I_{PRB_RA}^{lowest_index}/IN_{PHICH}^{group}\rfloor+n_{DMRS}+n_{offset}^{DL})\bmod 2N_{SF}^{group}$$

*wherein, $I^{lowest_index}_{PRB_RA}$ indicates a minimum Physical Resource Block (PRB) index in a first slot used in the uplink transmission, $I_{PHICH}$ is set to 1 for a time division duplex (TDD) uplink/downlink configuration 0 performing the uplink transmission at a subframe n=4 or 9 and to 0 for the other configurations, $N^{group}_{PHICH}$ indicates the number of PHICH groups configured by an upper layer, $n_{DMRS}$ is a value indicating a cyclic shift applied to a DeModulation Reference Signal (DMRS) for the uplink transmission, and $N^{PHICH}_{SF}$ indicates a spreading factor used in PHICH modulation.*

[6. The base station according to claim 4, wherein the ACK/NACK channel is a Hybrid automatic retransmission request Feedback A-MAP (HF-A-MAP) channel in an HF-A-MAP region, and the processor is configured so that a resource index of the HF-A-MAP channel is decided according to the following equation, $$k=(M(j)+n+n_{offset}^{DL})\bmod N_{HF\text{-}A\text{-}MAP}$$

where, $N_{HF\text{-}A\text{-}MAP}$ indicates a total number of HF-A-MAP channels configured per HF-A-MAP region, and j indicates an HF-A-MAP index parameter in a non-user specific A-MAP IE.]

7. A method of transmitting, by a user equipment being capable of simultaneously receiving signals from a plurality of nodes, [a ACKnowledgement/Negative-ACKnowledgement] *an acknowledgement/negative-acknowledgement* (ACK/NACK) signal to a base station controlling at least one of the plurality of nodes, the method comprising:

allocating a resource to an ACK/NACK channel carrying the ACK/NACK signal using an offset $n^{UL}_{offset}$ specific to the user equipment; and transmitting the ACK/NACK channel on the resource, wherein the offset $n^{UL}_{offset}$ is a value [decided] *determined* based on at least one [from among] *of:* a value defined by an upper layer with respect to the user equipment, an identifier of a node used in downlink transmission *in response to* which the ACK/NACK signal is transmitted, a type of the node used in the downlink transmission, an identifier of a node used in transmission of the ACK/NACK signal, a type of the node used in the transmission of the ACK/NACK signal, a pattern index of a reference signal allocated to the user equipment, or a multiplexing sequence of a resource used in the downlink transmission,

*wherein, based on the ACK/NACK channel being a physical uplink control channel (PUCCH), a resource, on which the PUCCH is transmitted, satisfies the following: $n_{PUCCH}^{(1)}=n_{CCE}+N_{PUCCH}^{(1)}+n_{offset}^{UL}$, and*

*wherein $n_{CCE}$ denotes An index of a 1st control channel element (CCE) to which a PDCCH of the user equipment is allocated, and $N^{(1)}_{PUCCH}$ denotes a system parameter decided by the upper layer.*

[8. The method according to claim 7, wherein the ACK/NACK channel is a Physical Uplink Control Channel (PUCCH), and a resource, on which the PUCCH is transmitted, is decided according to the following equation, $$n_{PUCCH}^{(1)}=n_{CCE}+N_{PUCCH}^{(1)}+n_{offset}^{UL}$$

where, $n_{CCE}$ is an index of a first Control Channel Element (CCE) to which a PDCCH of the user equipment is allocated, and $N^{(1)}_{PUCCH}$ is a system parameter decided by the upper layer.]

9. The method [according to] *of* claim 7, wherein *based on* the ACK/NACK channel [is] *being* a [Hybrid] *hybrid* automatic retransmission request [FeedBack CH] *feedback channel* (HFBCH) in a feedback region[, and]:

a resource index of the HFBCH [is decided according to] *satisfies* the following[equation,]:

$$k=(M(j)+n+n_{offset}^{UL})\bmod L_{HFB}$$

[where, $L_{HFB}$ indicates] *wherein $L_{HFB}$ denotes* a total number of HARQ feedback channels configured per feedback region, and j [indicates] *denotes* an HFBCH index parameter of a non-user specific A-MAP IE.

10. A user equipment for transmitting [an ACKnowledgement/Negative-ACKnowledgement] *being capable of simultaneously receiving signals from the plurality of nodes, an acknowledgement/negative-acknowledgement* (ACK/NACK) signal to a base station controlling at least one of a plurality of nodes, wherein the user equipment simultaneously receives signals from the plurality of nodes, the user equipment comprising:

[a processor configured to allocate a resource to an ACK/NACK channel carrying the ACK/NACK signal using an offset $n^{UL}_{offset}$ specific to the user equipment; and a transmitter configured to transmit the ACK/NACK channel on the resource under control of the processor, wherein the offset $n^{UL}_{offset}$ is a value decided based on at least one from among a value defined by an upper layer with respect to the user equipment, an identifier of a node used in downlink transmission in response to which the ACK/NACK signal is transmitted, a type of the node used in the downlink transmission, an identifier of a node used in transmission of the ACK/NACK signal, a type of the node to used in the transmission of the ACK/NACK signal, a pattern index of a reference signal allocated to the user equipment, or a multiplexing sequence of a resource used in the downlink transmission.]

*a transmitter;*

*a receiver; and*

*at least one processor coupled with the transmitter and receiver,*

*wherein the at least one processor is configured to;*

*allocating a resource to an ACK/NACK channel carrying the ACK/NACK signal using an offset* $n^{UL}_{offset}$ *specific to the user equipment; and*

*transmitting the ACK/NACK channel on the resource,*

*wherein the offset* $n^{UL}_{offset}$ *is a value determined based on at least one of:*

*a value defined by an upper layer with respect to the user equipment,*

*an identifier of a node used in downlink transmission in response to which the ACK/NACK signal is transmitted,*

*a type of the node used in the downlink transmission,*

*an identifier of a node to be used in transmission of the ACK/NACK signal,*

*a type of the node used in the transmission of the ACK/NACK signal,*

*a pattern index of a reference signal allocated to the user equipment, or*

*a multiplexing sequence of a resource used in the downlink transmission,*

*based on the ACK/NACK channel being a physical uplink control channel (PUCCH):*

*wherein a resource, on which the PUCCH is transmitted, satisfies the following:* $n_{PUCCH}^{(1)}=n_{CCE}+N_{PUCCH}^{(1)}+n_{offset}^{UL}$, *and*

*wherein* $n_{CCE}$ *denotes An index of a 1st control channel element (CCE) to which a PDCCH of the user equipment is allocated, and* $N^{(1)}_{PUCCH}$ *denotes a system parameter decided by the upper layer.*

[11. The user equipment according to claim 10, wherein the ACK/NACK channel is a Physical Uplink Control Channel (PUCCH), and the processor is configured so that a resource, on which the PUCCH is transmitted, is decided according to the following equation, $$n_{PUCCH}^{(1)}=n_{CCE}+N_{PUCCH}^{(1)}+n_{offset}^{UL}$$

where, $n_{CCE}$ is an index of a first Control Channel Element (CCE) to which a PDCCH of the user equipment is allocated, and $N^{(1)}_{PUCCH}$ is a system parameter decided by the upper layer.]

12. The [user equipment according to] *method of* claim [10] *7*, wherein *based on* the ACK/NACK channel [is] *being* a [Hybrid] *hybrid* automatic retransmission request [FeedBack CH] *feedback channel* (HFBCH) in a feedback region, [and the processor is configured so that] a resource index of the HFBCH [is decided according to] *satisifes* the following[equation,]:

$$k=(M(j)+n+n_{offset}^{UL})\bmod L_{HFB}$$

[where, $L_{HFB}$ indicates ] *wherein* $L_{HFB}$ *denotes* a total number of HARQ feedback channels configured per feedback region, and j [indicates] *denotes* an HFBCH index parameter of a non-user specific A-MAP IE.

*13. A method for a user equipment in a wireless communication system, the method comprising:*

*receiving, by the user equipment, a physical downlink control channel (PDCCH) carrying downlink control information for a physical downlink shared channel (PDSCH); and*

*transmitting, by the user equipment, acknowledgement/negative acknowledgement (ACK/NACK) information for the PDSCH on a physical uplink control channel (PUCCH) resource,*

*wherein the PUCCH resource is determined based on an index of a 1st control channel element (CCE) in the PDCCH, a first PUCCH resource offset and a second PUCCH resource offset,*

*wherein the first PUCCH resource offset is configured by a higher layer parameter, and*

*wherein the second PUCCH resource offset is determined from an antenna port used for transmission of the PDCCH.*

*14. The method of claim 13,*

*wherein the PUCCH resource* $n^{(1)}_{PUCCH}$ *satisfies the following:* $n^{(1)}_{PUCCH}=n_{CCE}+N^{(1)}_{PUCCH}+n_{offset}^{UL}$,

*wherein* $n_{CCE}$ *is related to the index of the 1st CCE,* $N^{(1)}_{PUCCH}$ *is related to the first PUCCH resource offset, and* $n^{UL}_{offset}$ *is related to the second PUCCH resource offset.*

*15. The method of claim 13, wherein the second PUCCH resource offset is a user equipment specific value.*

*16. The method of claim 13, wherein the second PUCCH resource offset is obtained based on the PDCCH.*

*17. The method of claim 13, wherein the first PUCCH resource offset is a cell-specific value.*

*18. A user equipment in a wireless communication system, the user equipment comprising:*

*a memory; and*

*at least one processor coupled with the memory,*

*wherein the at least one processor is configured to:*

*receive a physical downlink control channel (PDCCH) carrying downlink control information for a physical downlink shared channel (PDSCH); and*

*transmit acknowledgement/negative acknowledgement (ACK/NACK) information for the PDSCH on a physical uplink control channel (PUCCH) resource,*

*wherein the PUCCH resource is determined based on an index of a 1st control channel element (CCE) in the PDCCH, a first PUCCH resource offset and a second PUCCH resource offset,*

*wherein the first PUCCH resource offset is configured by a higher layer parameter, and*

*wherein the second PUCCH resource offset is determined from an antenna port used for transmission of the PDCCH.*

*19. The user equipment of claim 18,*

*wherein the PUCCH resource* $n^{(1)}_{PUCCH}$ *satisfies the following:* $n^{(1)}_{PUCCH}=n_{CCE}+N^{(1)}_{PUCCH}+n_{offset}^{UL}$,

*wherein* $n_{CCE}$ *is related to the index of the 1st CCE,* $N^{(1)}_{PUCCH}$ *is related to the first PUCCH resource offset, and* $n^{UL}_{offset}$ *is related to the second PUCCH resource offset.*

*20. The user equipment of claim 18, wherein the second PUCCH resource offset is a user equipment specific value.*

*21. The user equipment of claim 18, wherein the second PUCCH resource offset is obtained based on the PDCCH.*

*22. The user equipment of claim 18, wherein the first PUCCH resource offset is a cell-specific value.*

*23. A method for a base station in a wireless communication system, the method comprising:*

*transmitting, by the base station, a physical downlink control channel (PDCCH) carrying downlink control information for a physical downlink shared channel (PDSCH); and*

*receiving, by the base station, acknowledgement/negative acknowledgement (ACK/NACK) information for the PDSCH on a physical uplink control channel (PUCCH) resource,*

*wherein the PUCCH resource is determined based on an index of a 1st control channel element (CCE) in the PDCCH, a first PUCCH resource offset and a second PUCCH resource offset,*

*wherein the first PUCCH resource offset is configured by a higher layer parameter, and*

*wherein the second PUCCH resource offset is determined from an antenna port used for transmission of the PDCCH.*

*24. The method of claim 23, wherein the second PUCCH resource offset is a user equipment specific value.*

*25. The method of claim 23, wherein the second PUCCH resource offset is obtained based on the PDCCH.*

*26. The method of claim 23,*

*wherein the PUCCH resource* $n^{(1)}_{PUCCH}$ *satisfies the following:* $n^{(1)}_{PUCCH}=n_{CCE}+N^{(1)}_{PUCCH}+n^{UL}_{offset}$,

*where* $n_{CCE}$ *is related to the index of the first CCE,* $N^{(1)}_{PUCCH}$ *is related to the first PUCCH resource offset, and* $n^{UL}_{offset}$ *is related to the second PUCCH resource offset.*

*27. A base station in a wireless communication system, the base station comprising:*

*a memory; and*

*at least one processor coupled with the memory,*

*wherein the at least one processor is configured to:*

*transmit a physical downlink control channel (PDCCH) carrying downlink control information for a physical downlink shared channel (PDSCH); and*

*receive acknowledgement/negative acknowledgement (ACK/NACK) information for the PDSCH on a physical uplink control channel (PUCCH) resource,*

*wherein the PUCCH resource is determined based on an index of a 1st control channel element (CCE) in the PDCCH, a first PUCCH resource offset and a second PUCCH resource offset,*

*wherein the first PUCCH resource offset is configured by a higher layer parameter, and*

*wherein the second PUCCH resource offset is determined from an antenna port used for transmission of the PDCCH.*

*28. The base station of claim 27, wherein the second PUCCH resource offset is a user equipment specific value.*

*29. The base station of claim 27, wherein the second PUCCH resource offset is obtained based on the PDCCH.*

*30. The base station of claim 27,*

*wherein the PUCCH resource* $n^{(1)}_{PUCCH}$ *satisfies the following:* $n^{(1)}_{PUCCH}=n_{CCE}+N^{(1)}_{PUCCH}+n^{UL}_{offset}$,

*wherein* $n_{CCE}$ *is related to the index of the 1st CCE,* $N^{(1)}_{PUCCH}$ *is related to the first PUCCH resource offset, and* $n^{UL}_{offset}$ *is related to the second PUCCH resource offset.*

* * * * *